(12) United States Patent
Deb et al.

(10) Patent No.: US 7,548,848 B1
(45) Date of Patent: Jun. 16, 2009

(54) METHOD AND APPARATUS FOR SEMANTIC PROCESSING ENGINE

(75) Inventors: Alak Deb, San Jose, CA (US); Debashis Chatterjee, San Jose, CA (US)

(73) Assignee: Xambala, Inc., San Jose, CA (US)

( * ) Notice: Subject to any disclaimer, the term of this patent is extended or adjusted under 35 U.S.C. 154(b) by 659 days.

(21) Appl. No.: 10/753,846

(22) Filed: Jan. 7, 2004

Related U.S. Application Data

(60) Provisional application No. 60/438,931, filed on Jan. 8, 2003.

(51) Int. Cl.
*G06F 7/00* (2006.01)
*G06F 15/16* (2006.01)
*G06F 17/27* (2006.01)
*G06F 17/28* (2006.01)

(52) U.S. Cl. ............ 704/9; 704/4; 707/3; 707/10; 707/102; 709/201; 709/230

(58) Field of Classification Search .......... None
See application file for complete search history.

(56) References Cited

U.S. PATENT DOCUMENTS

| | | | |
|---|---|---|---|
| H1944 H | 2/2001 | Cheswick et al. | |
| 6,292,827 B1 * | 9/2001 | Raz ............... | 709/217 |
| 6,493,662 B1 | 12/2002 | Gillam | |
| 6,609,205 B1 | 8/2003 | Bernhard et al. | |
| 7,069,207 B2 * | 6/2006 | Corston-Oliver et al. ....... | 704/9 |
| 7,124,173 B2 | 10/2006 | Moriarty | |
| 7,254,634 B1 | 8/2007 | Davis et al. | |
| 2001/0039623 A1 | 11/2001 | Ishikawa | |
| 2002/0009076 A1 | 1/2002 | Engbersen et al. | |
| 2002/0108059 A1 | 8/2002 | Canion et al. | |
| 2002/0124187 A1 | 9/2002 | Lyle et al. | |
| 2002/0144153 A1 | 10/2002 | LeVine et al. | |
| 2002/0174194 A1 | 11/2002 | Mooney et al. | |
| 2002/0174340 A1 * | 11/2002 | Dick et al. .................. | 713/178 |
| 2003/0076848 A1 | 4/2003 | Bremler-Barr et al. | |
| 2004/0059725 A1 | 3/2004 | Sharangpani et al. | |
| 2004/0215593 A1 | 10/2004 | Sharangpani et al. | |
| 2006/0149840 A1 | 7/2006 | Thompson et al. | |
| 2007/0025351 A1 | 2/2007 | Cohen | |

OTHER PUBLICATIONS

Alonso et al., 'Tabular Alogrithms for TAG Parsing', Proceedings of EACL '99, pp. 150-157.*

(Continued)

*Primary Examiner*—David R Hudspeth
*Assistant Examiner*—Justin W Rider
(74) *Attorney, Agent, or Firm*—Martine, Penilla & Gencarella, LLP

(57) ABSTRACT

A method for evaluating contents of a message is provided. The method initiates with characterizing a message segment. Then, the message is scanned to define tokens associated with the message segment. Next, the tokens are parsed to define substructures. Then, the rules associated with the tokens are determined, wherein the rules define actions. At the same time determining the session or meta session associated with the communication. Then, the actions associated with the message are executed. Next, the message is queued to be sent out. A method for providing content based security, a computer readable media, an adapter card and a network device configured to provide content based security and an intrusion protection system are provided.

20 Claims, 29 Drawing Sheets

OTHER PUBLICATIONS

W3C, 'Speech Recognition Grammar Specification Version 1.0', W3C Candidate Recommendation Jun. 26, 2002.*

Sproull et al., "*Wide-area Hardware-accelerated Intrusion Prevention Systems (WHIPS)*," International Working Conference on Active Networking (IWAN), Oct. 27-29, 2004, Lawrence, Kansas, USA.

Madhusudan et al., "*Design of a System for Real-Time Worm Detection*," 12th Annual Proceedings of IEEE Hot Interconnects (HotI-12); Stanford, CA, Aug. 2004, pp. 77-83.

Schuehler et al., "*Architecture for a Hardware-Based, TCP/IP Content-Processing System*" IEEE Micro, vol. 24, No. 1, Jan. 2004, pp. 62-69.

Lockwood et al., "*Application of Hardware Accelerated Extensible Network Nodes for Internet Worm and Virus Protection*," International Working Conference on Active Networks (IWAN), Kyoto, Japan, Dec. 2003.

Moscola et al., "*Implementation of a Content-Scanning Module for an Internet Firewall*," FCCM, Napa, CA, Apr. 9-11, 2003.

Oberg et al., "Transition Graph Representation of FSM and its application to State Minimization in the ProGram complier," Electronic System Design Laboratory, Royal Institute of Technology, 1998, Stockholm, Sweden.

U.S. Appl. No. 10/753,727, filed Jan. 7, 2004, Deb et al.

U.S. Appl. No. 10/753,305, filed Jan. 7, 2004, Deb et al.

U.S. Appl. No. 10/753,584, filed Jan. 7, 2004, Deb et al.

Sanchez et al. ("Hardware support for a hash-based IP traceback" Sanchez, L.A.; Milliken, W.C.; Snoeren, A.C.; Tchakountio, F.; Jones, C.E.; Kent, S.T.; Partridge, C.; Strayer, W.T. DARPA Information Survivability Conference & Exposition II, 2001. DISCEX '01. Proceedings, vol. 2, Iss., 2001 pp. 146-152 vol. 2).

Noureldien, N.A.; Osman, I.M., "A stateful inspection module architecture," TENCON 2000. Proceedings, vol. 2, No., pp. 259-265 vol. 2, 2000.

Chang et al., Real-Time Protocol Analysis for Detecting Link-State Routing Protocol Attacks, Feb. 2001, ACM Transactions on Information and System Security, vol. 4, No. 1, pp. 1-13.

Abbes et al., Protocol Analysis in Intrusion Detection Using Decision Tree, 2004, IEEE.

Song et al., Efficient Packet Classification for Network Intrusion Detection using FPGA, Feb. 2005, ACM, pp. 238-245.

Vaidehi et al., A Semantics Based Application Level Intrusion Detection System, Feb. 2007, IEEE, pp. 338-343.

Faloutsos et al., "QoSMIC: Quality of Service sensitivie Multicast Internet protocol," 1998, ACM, pp. 144-153.

Oberg, Johnny, "*ProGram: A Grammar-Based Method for Specification and Hardware Synthesis of Communication Protocols*," Royal Institute of Technology, Department of Electronics, Electronic System Design, 1999, Stockholm, Sweden.

AnaGram, "*Introduction to Syntax Directed Parsing*," Copyright 1993-2002, Parsifal Software, http://www.parsifalsoft.com/isdp. html, pp. 1-10.

Hiran Ramankutty, "*Yacc/Bison—Prser Generators—Part 1*," Copyright 2003, Published in Issue 87 of Linux Gazette, Feb. 2003, http://www.linuzgazette.com/copying.html, pp. 1-7.

M.E. Lesk et al., "*Lex—A Lexical Analyzer Generator*," 1975 as per Citeseer.

Zerksis D. Umrigar, "Introduction to Shift-Reduce Parsing," Copyright 1997, http://www.cs.binghamton.edu/~zdu/parsdemo/srintro. html, pp. 1-6.

"*Lexical analysis*," Wikipedia, the free encyclopedia, http://en.wikipedia.org/wiki/Lexer, pp. 1-2, Jan. 2006.

Donnelly et al., *Bison*, The YACC-compatible Parser Generator, Nov. 1995, Bison Verison 1.25.

"*LR parser*," Wikipedia, the free encyclopedia, http://en.wikipedia.org/wiki/LR_parser, pp. 1-7, Jan. 2006.

Vern Paxson, "*Flex, version 2.5*" A fast scanner generator, Edition 2.5, Mar. 1995.

Biswadeep Nag, Staff Engineer, Performance Engineering, Sun Microsystems, "*Acceleration Techniques for XML Processors*," XML Conference, 2004.

Biswadeep Nag, "*Acceleration Techniques for XML Processors*," XML 2004, Proceedings by SchemaSoft, pp. 1-12.

* cited by examiner

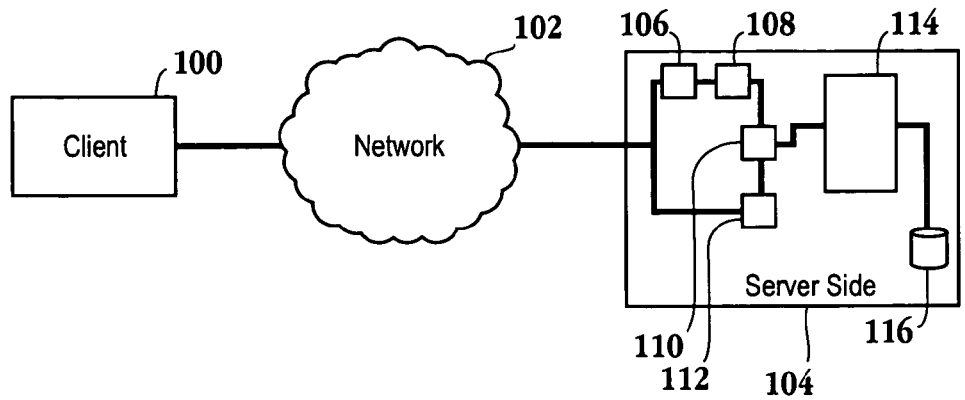
Fig. 1 *(prior art)*
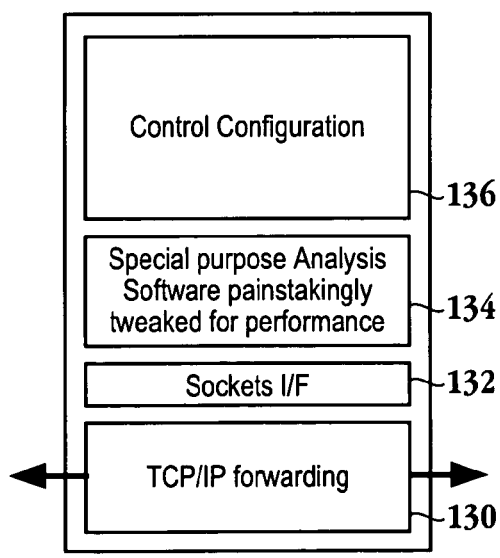
Fig. 2 *(prior art)*

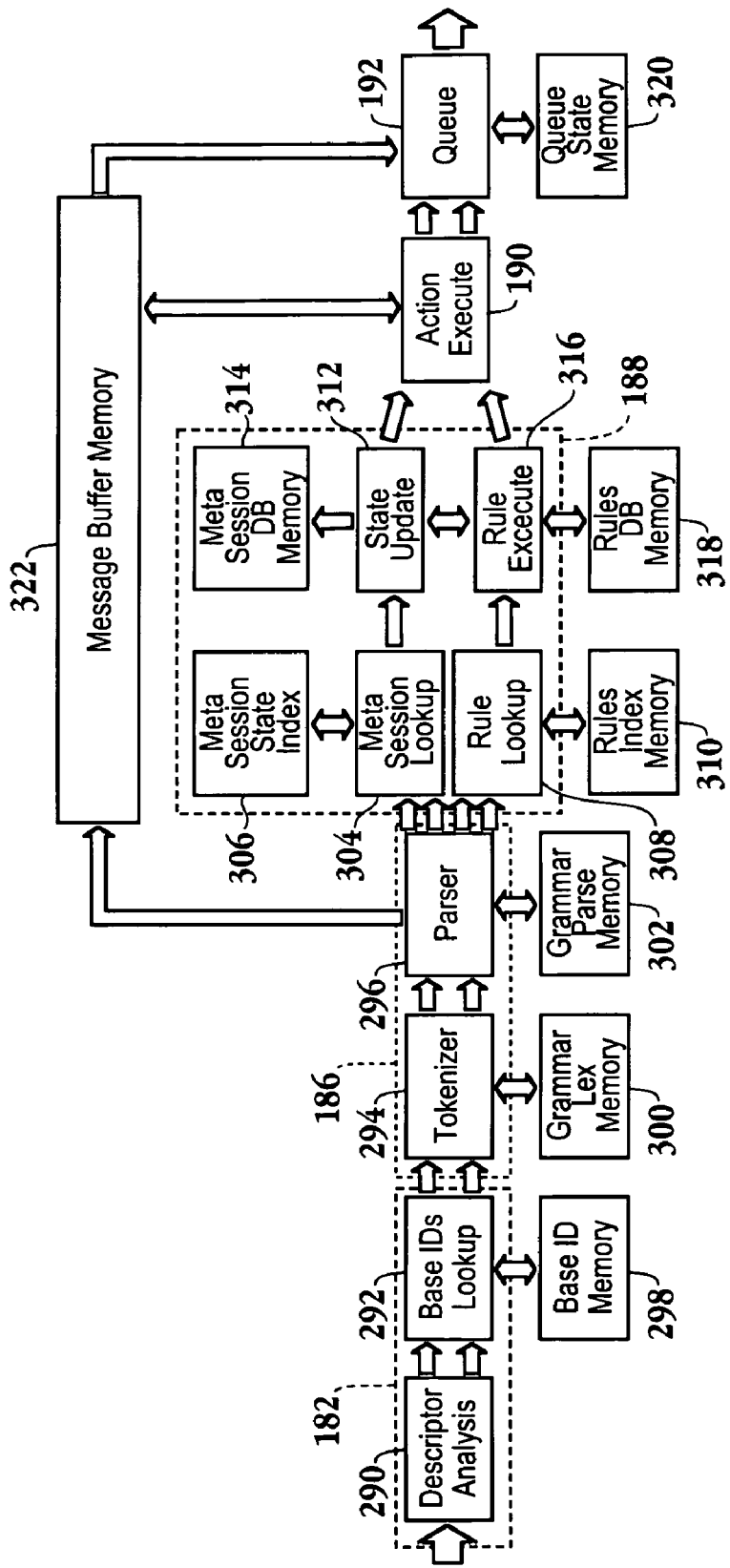

METHOD AND APPARATUS FOR SEMANTIC PROCESSING ENGINE

CROSS REFERENCE TO RELATED APPLICATIONS

This application claims priority from U.S. Provisional Patent Application No. 60/438,931 filed Jan. 8, 2003 and entitled "Method and Apparatus for Semantic Processing Engine." This provisional application is herein incorporated by reference in its entirety for all purposes.

BACKGROUND OF THE INVENTION

1. Field of the Invention

This invention relates generally to content and context based analysis of messages and documents in the area network security infrastructure and web services, more specifically to microprocessors configured to provide security through content based evaluation of incoming messages for packet based networks.

2. Description of the Related Art

Network bandwidth has dramatically increased to support the gigabit speeds enabling the enterprise systems and high volume electronic commerce (e-commerce) sites associated with the advent of the Internet. However, security systems configured to protect these networks from internal or external attacks have not developed in either sophistication or speed to provide adequate protection.

Intrusion detection systems (IDS) for high bandwidth packet based networks provide security by analyzing the wrapper or header of a message. However, a move is underway to provide security by looking at the actual content of the message rather than looking at the network layer header information or through encryption for packet based networks. Accordingly, devices in the middle of the network must understand the content of a message in the context of a sequence of message transactions to provide adequate security from hackers or insiders. FIG. 1 is a simplified schematic diagram of the security infrastructure for an enterprise system. External client 100 communicates with server 114 through distributed network 102, such as the Internet. Access to network 102 may be provided by an Internet service provider (ISP). Server side 104 includes middle devices such as, firewall 106, router 108 and switch 110. Switch 110 is in communication with server 114. Server 114 has access to database 116. Alternatively, the data path may proceed through IDS 112 through switch 114. It should be appreciated that it is desired to protect server 114 from internal clients, such as client 103, which may be used to hack into the server. Currently, there are not many available protections from internal clients. One skilled in the art will appreciate that the architecture of the security infrastructure can vary, however, each of the architectures employ some type of IDS for security, i.e., some type of architecture incorporating the middle devices described above.

One of the shortcomings with the intrusion detection systems typically employed to provide security for gigabit speed networks is that the IDS works at the packet level only and can not handle the Internet Protocol (TCP/IP) traffic fast enough to provide adequate protection as the network speed increases. As the intrusion detection system reaches its maximum processing capacity, a large number of packets are dropped. Consequently, the possibility of missing attacks significantly increases due to the dropped packets. Additionally, current intrusion detection systems may be overwhelmed by hacker tools that generate numerous suspicious events so that a hacker may sneak through the system. These tools can also cause the IDS to completely break down. Furthermore, when looking at the packet by packet information, only pieces of a message are being looked at. Thus, the pieces may get through the IDS separately and then be reassembled downstream to execute an unwanted intrusion. Firewalls do not cure the deficiencies of the IDS, because packets such as web traffic, i.e., traffic transferred via hypertext transfer protocol (HTTP), are generally allowed to pass through the firewall. Enterprise networks are actually being configured to include IDS's, without addressing any of the deficiencies.

Another shortcoming of the intrusion detection systems is that they analyze the encapsulation of the transmitted data, e.g., packet headers for packet based protocols, to detect attack signatures. Providing security through detection of the attack signatures leaves the system vulnerable to newly developed attack signatures constantly being thrown at networks by hackers. Thus, the content of the packet is unknown to the IDS. Additionally, systems based on regular expression searches, that are typically performed on level 7 (L7) string signatures, have limited capabilities with respect to content based evaluation for the IDS. Because of the limitations of regular expression searches many false positives are generated. For example, instructions for finding a .exe file in a GET request will generate matches for .exel files, exempt files, and .exe in parameters or comments of files. Even as the regular expression is refined further to handle the .exe files false positives still occur and real intrusions become buried among a large number of incorrect alerts that can be used purposely by a hacker to create and leverage security holes. Moreover, as the number of regular expression rules increase the memory requirements significantly expand, e.g., for 500,000 regular expression rules more than 1 gigabyte of memory may be required. Furthermore, if one of the rules changes the entire gigabyte + of memory for the regular expression rules must be rewritten, which requires that the system be brought down for some period of time. Furthermore, the processors supporting the IDS's can not analyze the grammar and contextual information or handle state information which has to be maintained across sessions that is required to create robust content based security devices. In short, current processors are unable to handle the in-line processing demands posed by content based security systems.

FIG. 2 is a simplified schematic diagram of the configuration of an in-line content based intrusion detection and prevention system for a network. Transmission control protocol (TCP)/IP forwarding 130 is provided by hardware associated with network boxes. For example, the network boxes may include hardware such as, switches, routers, appliances, etc. Software provides the functionality for sockets interface (I/F) 132, special purpose analysis software 134, and control configuration 136. Under the configuration illustrated in FIG. 2, the TCP/IP connection is terminated and the packet is transmitted to socket I/F 132. Special purpose analysis software 134 examines the packet headers and control configuration 136 determines which rules to apply based on the packet header examination. Special purpose analysis software 134 becomes a bottleneck in the processing and is not able to keep up with the gigabit speed networks.

Web services (and resource virtualization) are increasingly taking over the computing paradigm and enterprise application with the advent of such architectures as MICROSOFT-.NET, grid computing, and peer-to-peer networking. Each of these stress the processing resources of the network infrastructure as they require devices in the network to understand the content of messages and documents embedded within them. Use of XML and meta-data allow for efficient routing to appropriate servers as well as correct visualization by a client based on interpreting the message content.

As a result, there is a need to solve the problems of the prior art to provide a method and apparatus that allows for the evaluation of the content of a message based on the grammar that generated the message, and which will be used by the server to understand the message, and simultaneously minimizes the false positives generated by current systems. In addition, a processor or processing device configured to support a content based security system is needed.

SUMMARY OF THE INVENTION

Broadly speaking, the present invention fills these needs by providing a intrusion prevention system configured to provide content based security in an efficient manner for high speed networks. It should be appreciated that the present invention can be implemented in numerous ways, including as a method, a system, computer readable media or a device. Several inventive embodiments of the present invention are described below.

In one embodiment, a method for evaluating contents of a message is provided. The method initiates with characterizing a message segment. Then, the message is scanned to define tokens associated with the message segment. Next, the tokens are parsed to define substructures. Then, the rules associated with the tokens are determined, wherein the rules define actions. At the same time determining the session or meta session associated with the communication. Then, the actions associated with the message are executed. Next, the message is queued to be sent out.

In another embodiment, a method for performing semantic operations with contents of a message is provided. The method initiates with receiving a message. Then, a grammar associated with the message is identified. Next, the message is converted into a token stream. Then, a parse tree defined by tokens of the token stream is created. Next, rules associated with the tokens are identified. Meta sessions may be used here to relate different messages. Next, actions defined by the rules are executed. Then, the message is forwarded to a destination.

In yet another embodiment, a computer readable media having program instructions for evaluating the contents of a message is provided. The computer readable media includes program instructions for characterizing a message segment. Program instructions for scanning the message segment to define tokens associated with the message segment and program instructions for parsing the tokens to define substructures are included. Program instructions for determining rules associated with the tokens, wherein the rules define actions are provided. Program instructions for executing the actions associated with the message and program instructions for queuing the message to be sent out are included.

In still yet another embodiment, a processor configured to identify message contents is provided. The processor includes a message characterization engine configured to characterize a message through analysis of header information associated with the message. A semantic processing engine configured to translate the message into tokens associated with segments of the message is included. The semantic processing block identifies rules associated with each of the tokens and the semantic processing block is configured to apply the identified rules to the message. A queuing engine configured to queue the message to be transmitted from the processor is included.

In another embodiment, a processor configured to perform semantic operations on high speed traffic is provided. The processor includes a characterization block configured to determine a grammar associated with a message. A parsing block configured to parse the message into tokens, wherein the tokens are associated with segments of the message is provided. A state and rule block configured to maintain states across sessions and apply a set of rules associated with each of the tokens to each of the segments of the message is included. A queuing block configured to queue the message for transmission to a destination is provided.

In yet another embodiment, an adapter card for providing intrusion prevention for a network is provided. The adapter card includes a semantic processing unit (SPU) configured to provide content based security for communications through a packet based network. The SPU includes a message characterization engine configured to characterize a message through analysis of header information associated with the message. A semantic processing engine configured to parse the message into tokens associated with segments of the message through grammar based parsing is included in the SPU. The semantic processing block identifies rules associated with each of the tokens. The semantic processing block is configured to apply the identified rules to the message. A queuing engine configured to queue the message to be transmitted from the SPU is provided.

In still yet another embodiment, a network device configured to provide content based security is provided. The network device includes circuitry for scanning a message to define tokens associated with the message. Circuitry for extracting substructures from the tokens and circuitry for identifying rules associated with the tokens are included. Circuitry for executing the identified rules is included.

In another embodiment, an intrusion prevention system configured to provide a secure network environment is provided. The intrusion prevention system includes a security monitor central processing unit (CPU). A semantic processing unit (SPU) being managed by the security monitor CPU is included. The SPU is configured to provide content based security for communications through a packet based network. The SPU includes a message characterization engine configured to characterize a message through analysis of header information associated with the message. A semantic processing engine configured to parse the message into tokens associated with segments of the message through grammar based parsing is included in the SPU. The semantic processing block identifies rules associated with each of the tokens. The semantic processing block is configured to apply the identified rules to the message. A queuing engine configured to queue the message to be transmitted from the SPU is included in the SPU.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIG. 1 is a simplified schematic diagram of the security infrastructure for an enterprise system.

FIG. 2 is a simplified schematic diagram of the configuration of an intrusion detection and prevention system for a network that is capable of message content inspections.

FIG. 9 is an internal schematic diagram of the semantic processing unit in accordance with one embodiment of the invention.

DETAILED DESCRIPTION OF THE PREFERRED EMBODIMENTS

An invention is described for a system, apparatus and method for performing semantic processing to provide security and implement web services based upon message content. It will be obvious, however, to one skilled in the art, that the present invention may be practiced without some or all of these specific details. In other instances, well known process operations have not been described in detail in order not to unnecessarily obscure the present invention. FIGS. 1 and 2 are described in the "Background of the Invention" section.

The embodiments described herein provide a method and system that employs a programmable processor configured to perform semantic operations on high speed network traffic. The programmable processor, referred to as a semantic processing unit (SPU), is designed to work in conjunction with general purpose central processing units (CPUs) and network processing units (NPUs), TCP offload engines, (TOE), Secure sockets layer (SSL) accelerators, etc., through standard interfaces. In one embodiment, the programmable processor accelerates the processing of parameters for application-to-application communication, storage and data center solutions, in addition to the security applications discussed herein. Rather than parse and process fixed size integer fields in the headers of packets, as performed by existing packet processing devices, the semantic processing engine referred to herein parses and processes the actual message of the packet in order to understand the meanings associated with the message. Thus, the processing engine is configured to accommodate the variable size message fields in the character fields as opposed to fixed size integers. The ability to understand the meaning of the messages associated with packet based networks allows for a more powerful Intrusion Detection System (IDS,) referred to herein as an Intrusion Prevention System (IPS).

Figure 3:
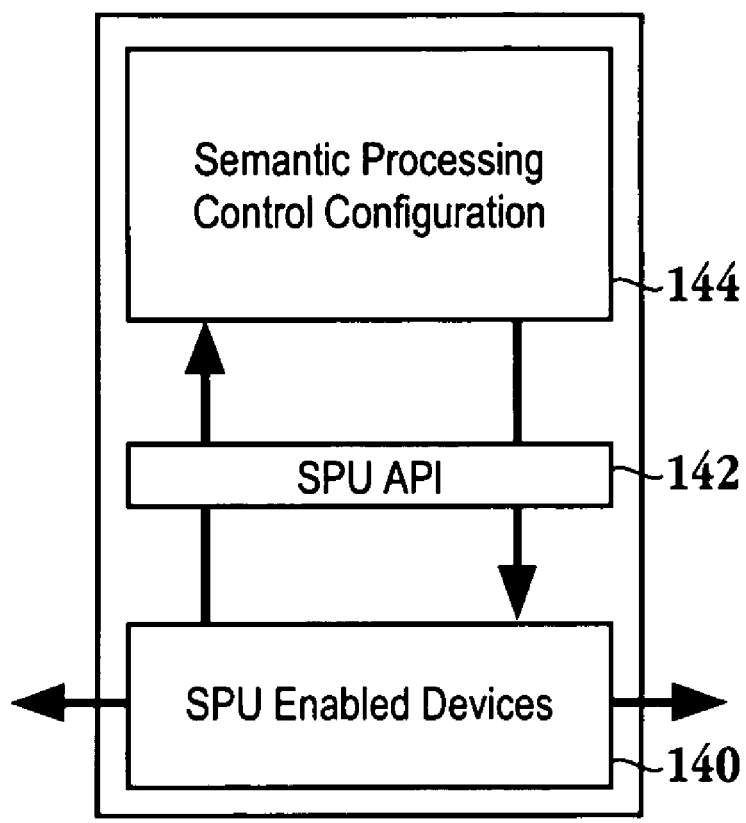
FIG. 3 is a high level system configuration for a semantic processing system in accordance with one embodiment of the invention.

FIG. 3 is a high level system configuration for a semantic processing system in accordance with one embodiment of the invention. Here, semantic processing unit (SPU) enabled device 140 is configured to handle the Transmission Control Protocol (TCP)/Internet Protocol (IP) forwarding of packets to SPU application programming interface (API) 142, where semantic processing and socket interface functionality are provided. Semantic processing control configuration 144 defines the rules and actions applied to perform the semantic processing.

Semantic processing as used herein may be defined with reference to the following example. If an individual accesses a web site for a newspaper through the Internet and wishes to access a restricted section of the website, e.g., a paid subscription is required for access to the restricted section, then the following exemplary hypertext transfer protocol (HTTP) message is transmitted on the network pipe:

Get / restrictedaccessnews.html HTTP/1.1

Host: online.newspaper.com

Referrer: http://www.newspaper.com/cgi-bin/phf

User-Agent: Mozilla/2.0

Here, an IDS not capable of semantic processing would have to determine if this is a request for a restricted page. Then, based upon the individuals session history access may be blocked or the individual may be forwarded to the securely located site that contains the restricted information or page. However a semantic processor would perform semantic processing to yield the following information:

Method = GET

Http_URL = /restrictedaccessnews.html
   Directory = BASE
   Filename = restrictedaccessnews
   FileExtension = html Version = HTTP/1.1

HTTP_HOST = online.newspaper.com

HTTP_REFERRER = http://www.newspaper.com/cgi-bin/phf

HTTP_USERAGENT = Mozilla/2.0

Here, the meaning of the left hand side label, e.g., Method, Http_URL, Version, etc., are semantically well understood structures by the IPS device. That is, a mapping is made between the incoming string and the left hand side labels described above.

Accordingly, semantic processing recognizes structures within messages based on grammars and context. Rules are applied and actions performed based upon the recognized structures. In addition, states are accumulated and associated with a meta session, that is persistent across transactions sessions and packets. The states associated with a meta session may mirror the states of the communicating applications. It should be appreciated that by looking at the content of the message, rather than the packet header, more specific information corresponding to the nature of the communication is able to be extracted as illustrated above. While the semantic processor described herein refers to specific examples of use with content based security, the processor may be employed with extensible markup language (XML), web acceleration, content based storage at high speeds, etc.

Figure 4A:
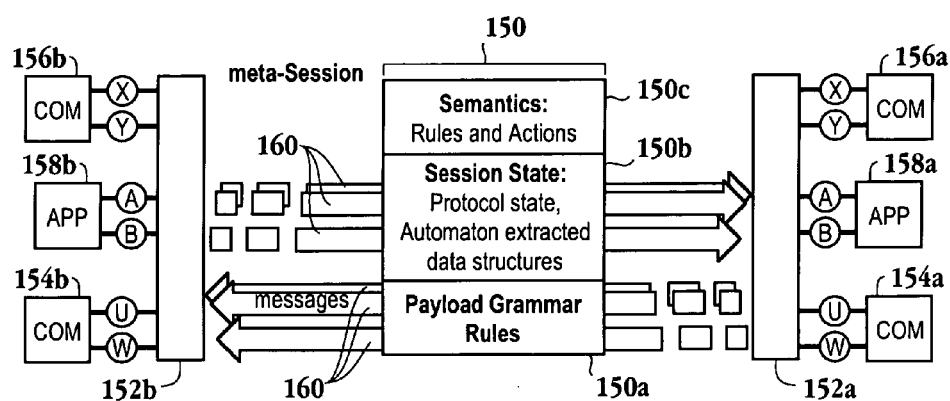
FIG. 4A is a schematic diagram illustrating the semantic processing abstraction in accordance with one embodiment of the invention.

FIG. 4A is a schematic diagram illustrating the semantic processing abstraction in accordance with one embodiment of the invention. Here, semantic processing block 150 sits in the middle of communicating clients 152*a* and 152*b*. Messages 160 are processed through semantic processing block 150 as the messages travel between clients 152*a* and 152*b*. In order to provide content based security, semantic processing block 150 understands the grammar associated with the messages being communicated between application 158*a* and 158*b* and between COM 154*a*, 154*b*, 156*a* and 156*b*. Thus, payload grammar rules block 150*a* applies grammar rules to parse the incoming message contents as discussed above with reference to FIG. 3. Session state block 150*b* maintains states across sessions as multiple communications may take place between clients 152*a* and 152*b*. Therefore, the accumulated states which are associated with a meta session are persistent across transactions, sessions and packets. Semantics block 150*c* applies rules and actions based upon the grammar parsing. Here, complex actions such as transforming, translating or inserting messages may be performed.

Figure 4B:
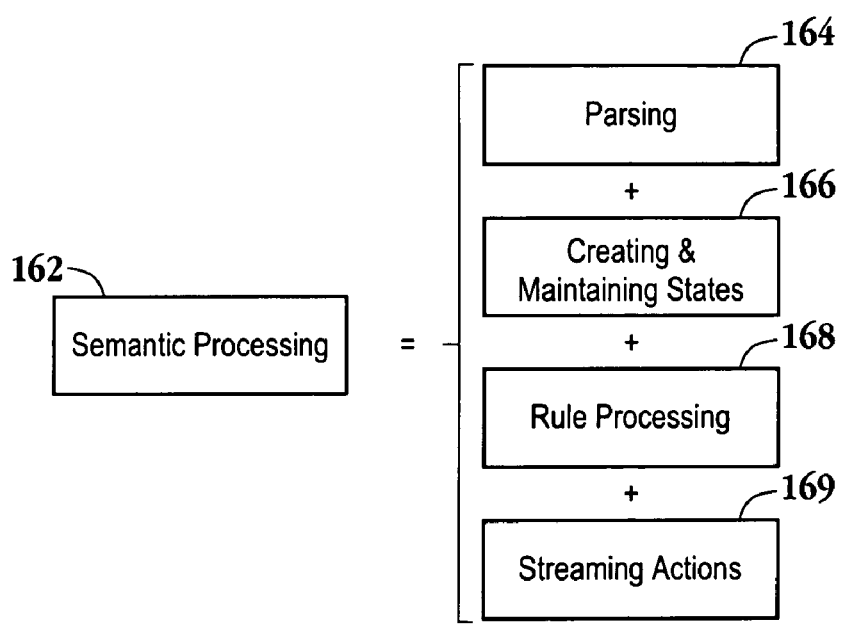
FIG. 4B is a schematic diagram illustrating the components defined by semantic processing in accordance with one embodiment of the invention.

FIG. 4B is a schematic diagram illustrating the components defined by semantic processing in accordance with one embodiment of the invention. Semantic processing 162 is composed of parsing 164, creating and maintaining states 166, rule processing 168 and streaming actions 169. Parsing 164 includes using grammars and contextual information associated with tokens, while creating and maintaining states 166 includes the ability to maintain state information to recognize packets from familiar clients. Rule processing 168 includes the ability to describe rules in term of high level programming language where the rules directly address parsed data structures. Additionally, data structures, e.g., indexing tress, allow for the efficient determination of applicable rules to a message. Streaming actions 169 allow for the efficient application of actions, e.g., applying rules, to the messages in order to maintain throughput in gigabit speed networks.

Figure 5A:
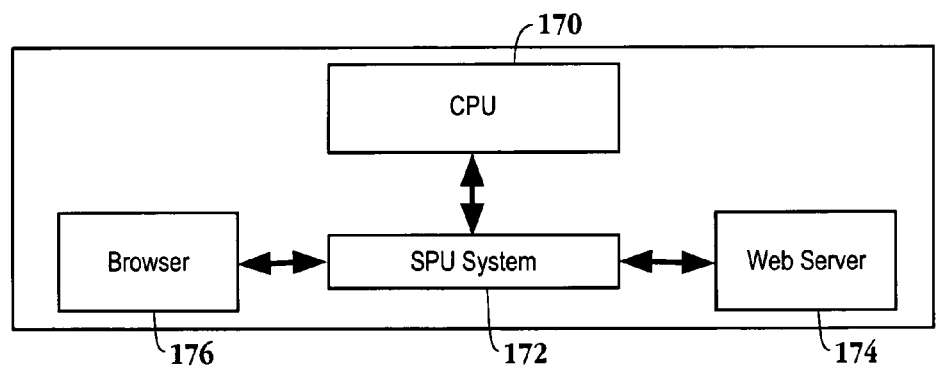
FIG. 5A is a high level schematic diagram of a semantic processing unit (SPU) system configured to provide content based security for communicating entities in accordance with one embodiment of the invention.

FIG. 5A is a high level schematic diagram of a semantic processing unit (SPU) system configured to provide content based security for communicating entities in accordance with one embodiment of the invention. Here, CPU 170 is in communication with SPU system 172. In one embodiment, CPU 170 manages the activities of a semantic processing unit of SPU system 172. SPU system 172 sits between web server 174 and browser 176, however it should be appreciated that SPU system 172 may be configured to sit between any two communicating entities where messages are being exchanged between the two entities. In one embodiment, CPU 170 creates instances of SPU system 172 in memory. In another embodiment, application program interfaces are created to enable management software to control SPU system 172.

Figure 5B:
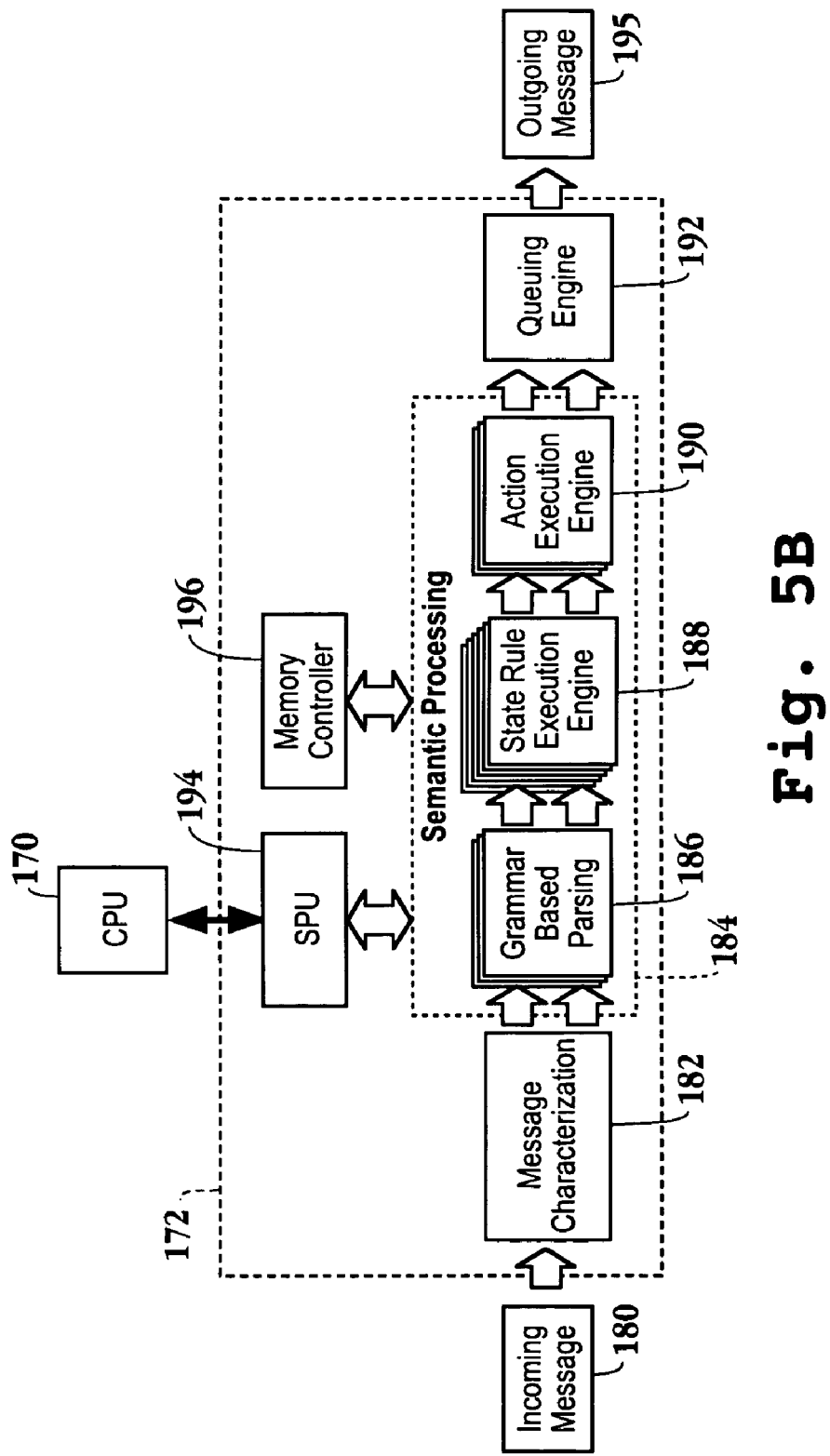
FIG. 5B is a more detailed schematic diagram of the SPU system of FIG. 5A

FIG. 5B is a more detailed schematic diagram of the SPU system of FIG. 5A. Incoming message 180 is received by message characterization block 182 of SPU system 172. Message characterization block 182 is configured to characterize the message. For example, characterization block 182 determines a type of grammar associated with the message through examination of header information where the message is transmitted over a packet based network. Semantic processing block 184 includes grammar based parsing block 186, state and rule execution block 188 and action execution block 190. Semantic processing block 184 is in communication with SPU 194 and memory controller 196. Memory controller 196 controls a plurality of memories associated with SPU system 172 such as the memories illustrated in FIG. 21. In one embodiment, SPU 194 is an embedded SPU. Action execution block 190 is in communication with Queuing block 192. Queuing block 192 is configured to queue messages and send outgoing message 194 to a destination. CPU 170 is in communication with SPU 194, and is configured to manage the activities of the SPU. It should be appreciated that the single data path coming into SPU system 172 is split into two data paths through semantic processing block 184. The two data paths represent a data path for the actual message and a data path for control information related to the message. In one embodiment, SPU 194 is initialized each time SPU system 172 is powered up. During initialization, CPU 170 initializes SPU 194 with a SPUCreateInstance getting a handle to the SPU memory map and setting up all communication channels. That is, CPU 170 keeps registers and memory locations in host space for mapping. CPU 170 then prepares the SPU with SPUCreateApplicationInstance getting a handle to the SPU security monitor related memory map and allocates memory space. CPU 170 then loads all object code for grammar, meta-state definitions, rules, etc., with SPUDownloadApplicationComponent and then starts the security monitor application by SPUStartApplication. Exemplary initialization rules are provided below:

Initialization Rules

```
/* Initialization Rules File */
#define MAX_BASE_SESSION 50000
#define MAX_STREAM 8
#include typedefs.plc
#include meminit.plc
#include diagrules.plc
Typedef Struct baseSessionId
{
    DWORD sourceIpAddress; DWORD destinationIPAddress;
    DWORD tcpSourcePort; DWORD tcpDestinationPort;
    DWORD sequenceNumber
} BASE_SESSION_ID;
BASE_SESSION_ID baseSessionPool [MAX_BASE_SESSION];
```

For example, when a client sends a GET request to a server incorporating the IPS described herein, the SPU of the IPS sets up a session identification (ID). The server may generate a response with SET COOKIE headers. The SPU, such as SPU 194 with reference to FIG. 5B, deletes all SET COOKIE headers from a response to the client and saves the session ID state with an ID number. The ID number is then added as a parameter to all the URL's associated with the response. The client then clicks on one of the URL's to generate a new get request. The SPU then identifies the session ID state of the new request with the ID number. The ID number is removed from the URL parameter and all COOKIEs are restored unless a COOKIE has expired. Thus, the server uses the COOKIEs as if the SPU system does not exist, as illustrated further with reference to FIG. 6B.

It should be appreciated that CPU 170 of FIG. 5B responds to interrupts from SPU 194 and uses SPUDataTransfer calls to set up any periodic or event based data transfers from the SPU. CPU 170 may stop the security monitor application by SPUStopApplication and delete the security monitor application by SPUDeleteApplication or SPUDeleteInstance commands.

Upon initialization, characterization rules are applied to each incoming message. In one embodiment, the characterization rules identify a type of grammar used to build the incoming message by examining header information. Exemplary characterization rules are provided below:

Characterization Rules

```
#include typedefs.plc
int function masterclassifer (void)
{
int gramType = message.hdrType;
If (gramType=HTMLinHTTP)
    gramhdr=MESSAGE_TYPE_HTML;
```

It should be appreciated that any type of grammar may be identified by characterization rules similarly configured as the rules provided above to identify hypertext markup language (HTML).

Still referring to FIG. 5B, it should be appreciated that each of blocks 182, 186, 188, 190 and 192 are configured as programmable engines. In another embodiment, each of the programmable engines are static random access memory (SRAM) based engines that initialize each time upon startup. Thus, initialization rules are applied each time the SPU comes out of reset.

Grammar based parsing block 186 includes a lexical analysis engine where token identifications are created and a grammar parsing block where tokenization information associated with the message is created. As used herein tokenization is a process where a list of keywords is searched for and the structure of sub-strings between the key words are inferred to create semantical interpretations of the message. Tokenization allows for smaller regular expression sets on subsections of a message and results in simple hardware acceleration compared to a regular expression search across all patterns and complete messages. It will be apparent to one skilled in the art that the grammars need to be defined. In one embodiment, a lexical analyzer generator (LEX) and yet another compiler-compiler (YACC) are tools used to read the source program and determine its structure. Here, LEX creates the tokens and YACC takes the created tokens and reorganizes a sub-structure of the message. That is, LEX generates programs to be used in simple lexical analysis of text. The input files (standard input default) contain regular expressions to be searched for and actions written in C programming language to be executed when expressions are found. YACC converts a context-free grammar and translation code into a set of tables for a parser and translator. It is possible that a grammar may be ambiguous in which case specified precedence rules are used to break ambiguities.

Grammar rules are applied in grammar based parsing block 186. It should be appreciated that grammar rules include lexical rules and parsing rules. Exemplary lexical and parsing rules are provided below:

| LEXICAL RULES | |
| --- | --- |
| bit | 0 \| 1 |
| digit | [0-9] |
| CR | % x0D |
| LF | % x0A |
| SP | % X20 |
| HT | % X09 |
| lower_case_alpha | [a-z] |
| upper_case_alpha | [A-Z] |

```
HTTP_Request        : Request_Line_Array Header_options CRLF
    maybe_message_body;
Request_Line_Array  : Request_Line_Array Request_Line | ;
Header_options_CRLF: Header_options CRLF ;
```

It should be appreciated that the parsing rules create tokens associated with segments of the message as discussed with reference to FIG. 7.

State and rule execution block 188 of FIG. 5B extracts state information from message. State and rule execution block 188 also creates a rule index from all parameters and determines the pointer to the rule body. As will be explained further below, SPU system 172 is capable of maintaining states, i.e., keep certain portions of information and match it to returning messages from the same sender. Meta session and state rules are executed through state and rule execution block 188. Meta session and state rules include a set of rules to define a meta session, which includes associate states and transitions among the associated states. In addition, a state accumulation policy is defined through the meta session state rules.

Action execution block 190 processes the rules defined in block 188 to perform an action with respect to the message. It should be appreciated that the semantic rules, e.g., defining the state, defining the rules, defining the actions, etc., for semantic processing block 184 can be written in C code using a string library, such as the string library provided in Table 1. Accordingly, the software executed by SPU system 172 can be built in a manner in which programmers can easily program. Semantic rules include condition statements expressed in terms of message grammar, states, and defining associated actions. Exemplary semantic rules include:

Semantic Rules
// check for cgi-bin director, Perl executable with ext.exe or .com or
simply null and no parameters
If (stringinstring(read(cgibinDir),payload.urlDir) &&
  stringcompare(payload.urlFilename, PERL, false)
  &&
  ((payload.urlFileExt==NULL) ||
  (findlist(payload.urlFileExt,fileExts, false, 2) != −1))
  &&
  (payload.urlparams == NULL))
  return 1; // signature match
  return 0; // no signature match Queuing engine block of FIG. 5B is associated with queuing and traffic management rules. In one embodiment, queuing and traffic management rules define a set of rules specifying the policies for sharing output link bandwidth.

Figure 6A:
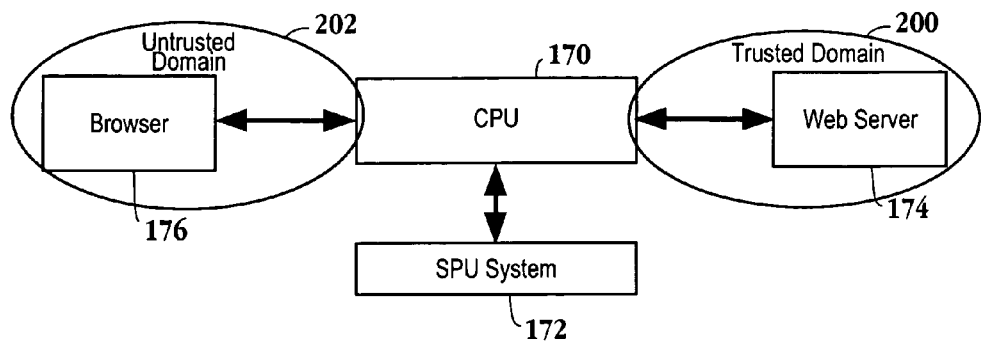
FIG. 6A is a high level schematic diagram of a semantic processing unit (SPU) system providing content based security for communicating entities similar to FIG. 5A.

FIG. 6A is a high level schematic diagram of a semantic processing unit (SPU) system providing content based security for communicating entities similar to FIG. 5A. Here, communications within trusted domain 200 may or may not pass through SPU system 172. It should be appreciated that communication within trusted domain 200 provide a level of confidence that the security is sufficient to bypass SPU system 172. Of course, the communications from trusted domain may pass through SPU system 172 if desired. Untrusted domain 202 includes communications emanating from unfamiliar/non-secure sources. Therefore, communications from the untrusted domain pass through SPU system 172. It should be understood that the trusted domain may be a section of the network within an enterprise that does not contain potential insecure clients and does not necessarily have to be outside the enterprise. That is, the trusted domain and the untrusted domain may be part of the same enterprise.

Figure 6B:
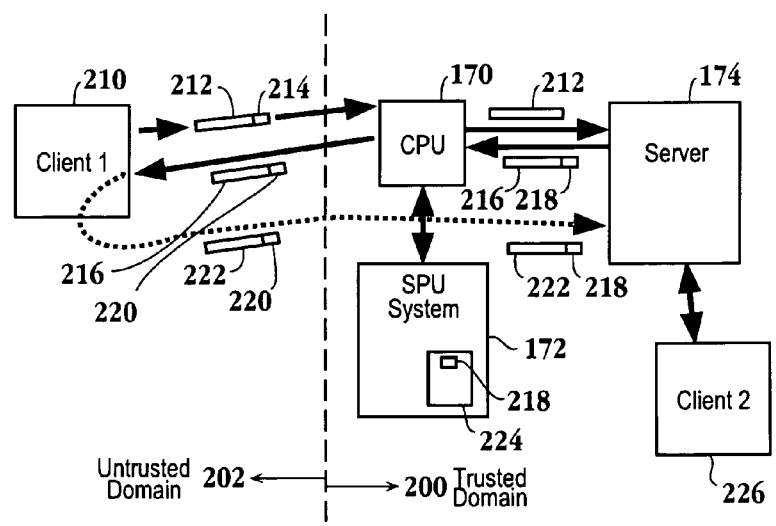
FIG. 6B is a high level schematic diagram illustrating how states are maintained in accordance with one embodiment of the invention.

FIG. 6B is a high level schematic diagram illustrating how states are maintained in accordance with one embodiment of the invention. Here, client 1 210 transmits message 212 to a secure site supported by server 174. Message 212 includes cookie 214, which may be sent out through the client 1's browser. SPU system 172 receives message 212 from CPU 170 and strips cookie 214 from message 212. Message 212 is then forwarded to server 174 without cookie 214. Server 174 responds to message 212 with message 216 and attaches cookie 218 to message 216. Since message 216 is being transmitted outside trusted domain 200, i.e., to untrusted domain 202, cookie 216 is removed by SPU system 172 as it may have information that should not want to be sent out of trusted domain 200. For example, with respect to an e-commerce site, cookie 218 may contain information indicating the cost of products purchased through client 1 210. Thus, it may be possible for client 1 210 to change the price of the products if cookie 218 is sent to client 1 210. Cookie 218 is stored in state storage 224, i.e., the state will be held, and message 216 is forwarded to client 1 210. Key 220 is appended to message 216 prior to the message being transmitted to client 1 210. Key 220 is associated with cookie 218 so that when client 1 210 responds to message 216, cookie 218 replaces key 220 so that server 174 sees cookie 218. Here, message 222 is the response to message 216 and SPU system 172 replaces key 220 with cookie 218 prior to message 222 being received at server 174. It should be appreciated that correspondence within the trusted domain, i.e., between server 174 and client 2 226 may be executed without the need to remove and replace the cookie form the server as the correspondence is executed entirely in trusted domain 200. Accordingly, state storage 224 of SPU system 172 allows for maintaining states and relating the states to the corresponding sides of a conversation.

Figure 7:
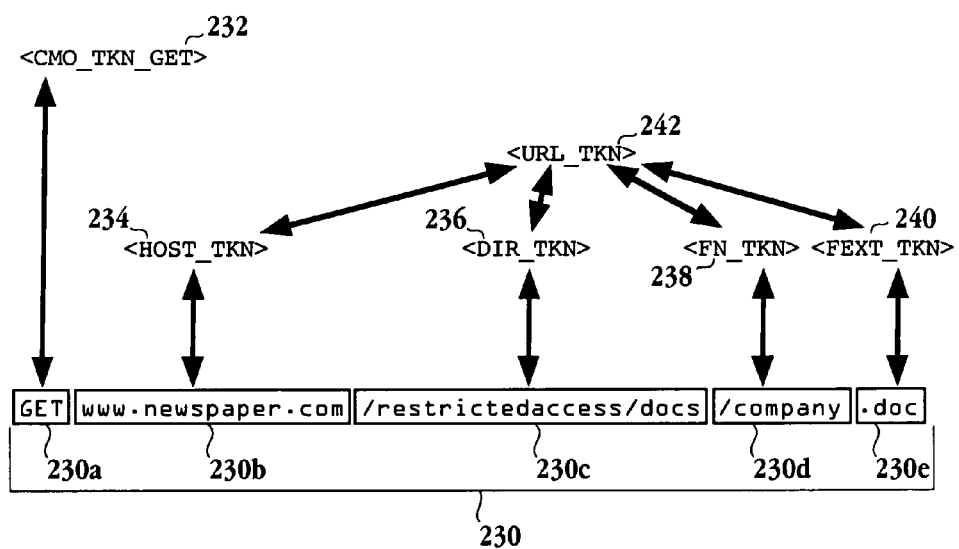
FIG. 7 is a schematic diagram illustrating the parsing and tokenization of an exemplary command containing a uniform resource locator (URL) in accordance with one embodiment of the invention.

FIG. 7 is a schematic diagram illustrating the parsing and tokenization of an exemplary command containing a uniform resource locator (URL) in accordance with one embodiment of the invention. Command 230 includes GET command 230a, which is associated with command token 232. The URL portion of command 230 which is composed of host portion 230b, directory portion 230c, file name portion 230d, and file extension portion 230e. The URL portion of command 230 is associated with URL token 242. URL token 242 is composed of substructures which include host token 234, directory token 236, file name token 238 and file extension token 240. In one embodiment, a numeric identifies each of the tokens.

Figure 8A:
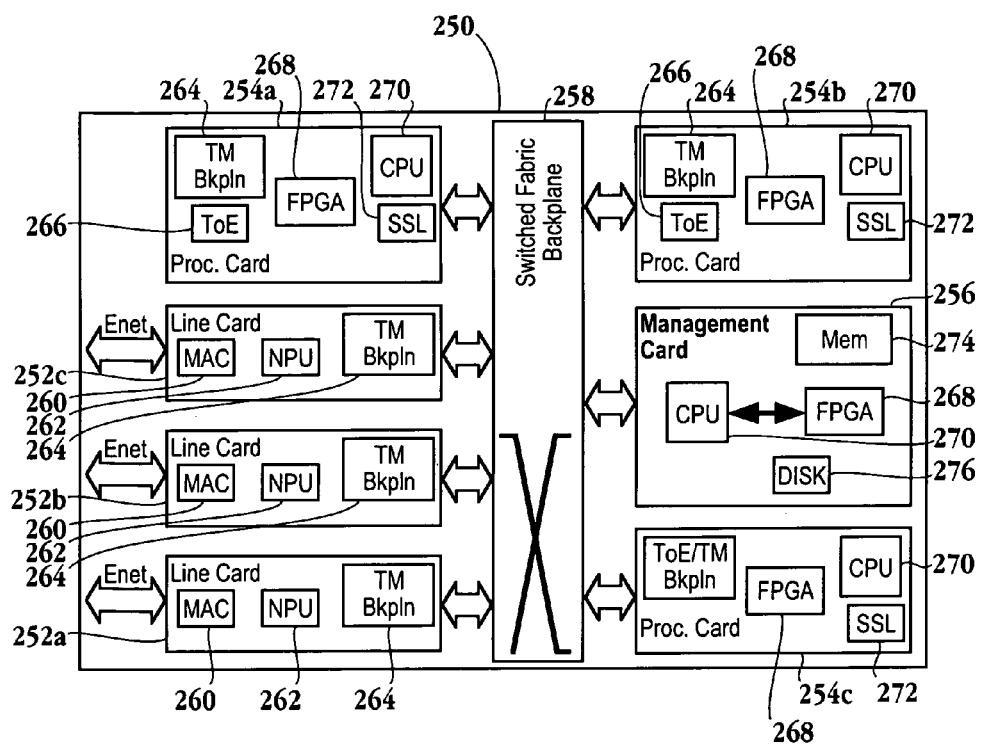
FIG. 8A is a schematic diagram of the topology of a network system.

FIG. 8A is a schematic diagram of the topology of a network system. Here, system 250, which may include router switches and the like, includes process cards 254a, 254b and 254c, line cards 252a, 252b and 252c and management card 256, each of which are in communication with each other through switched fabric backplane 258. Line cards 252a-c are configured to receive Ethernet packets and include media access control (MAC) engine 260 network processing unit (NPU) 262 and traffic management (TM) backplane 264. Processing cards 254a-c include TM backplane 264, TCP offload engine (ToE) 266, field programmable gate array (FPGA) 268, CPU 270, and SSL 272. It will be apparent to one skilled in the art that processing cards 254a-c may be configured to perform SSL acceleration. Management card 256 includes CPU 270, Memory 274, FPGA 268 and disk 276.

Figure 8B:
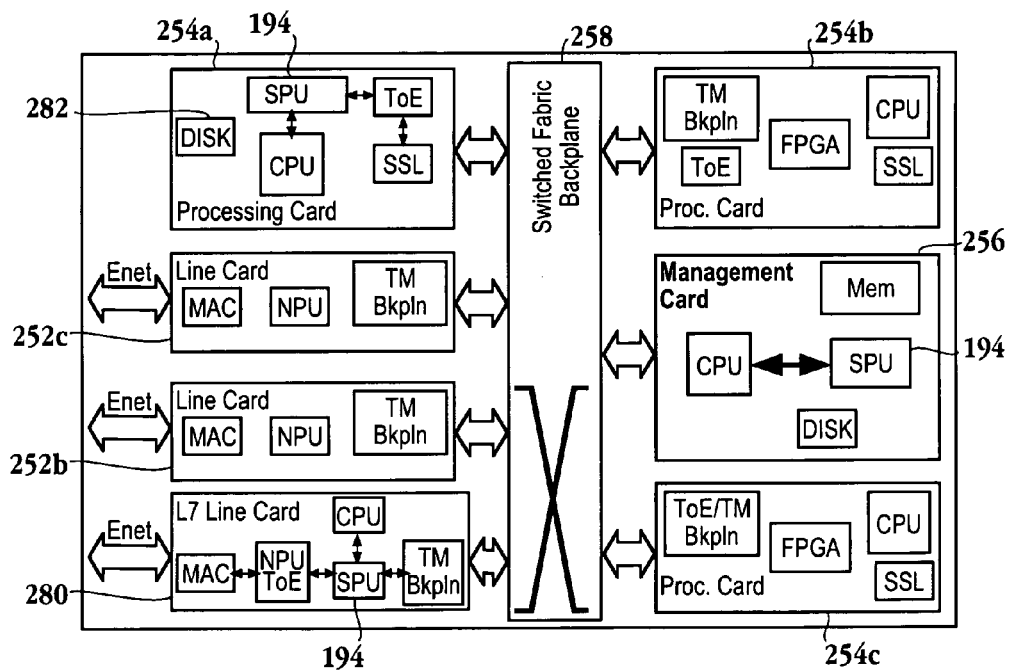
FIG. 8B is a schematic diagram of the topology of a network system configured as an intrusion prevention system in accordance with one embodiment of the invention.

FIG. 8B is a schematic diagram of the topology of a network system configured as an intrusion prevention system in accordance with one embodiment of the invention. Here, semantic processing unit (SPU) 194 is included in one of the cards. It should be appreciated that SPU 194 is configured to provide content based security as described in the embodiments herein. FIG. 8B illustrates SPU 194 as being placed on either a processing card 254, memory card 256 or layer 7 (L7) line card 280. SPU 194 is illustrated in each of processing card 254, memory card 256 and L7 line card 280 for exemplary purposes only and it should be appreciated that SPU 194 may be included at multiple locations or a single location, as one SPU may be sufficient per system. In one embodiment, SPU 194 sits on a printed circuit board (PCB), e.g., an adapter card that can be plugged into a corresponding processing card, line card or management card. With respect to processing card 254a, disk 282 is included where SPU 194 includes a disk interface. For example, disk 282 may be used to store data associated with maintaining states. It should be further appreciated that the security protection system, of which SPU 194 is a component may be configured as a stand alone system, such as an appliance or network device. Alternatively, SPU 194 may be incorporated into a network device, e.g., a router, a firewall, etc.

FIG. 9 is an internal schematic diagram of the semantic processing unit in accordance with one embodiment of the invention. Message characterization block 182 includes descriptor analysis block 290 and base identification (ID) lookup block 292. Here, the header information of an incoming message is looked at by descriptor analysis block 290 to determine a type of grammar used in an incoming message. An exemplary incoming message of an upstream device, such as a ToE, CPU, NPU, etc., provides the basic information on the TCP flow, including the direction of the communication and the lexeme stream, as illustrated below:

```
ToE Header >>

1                                  // Direction, 0 = S2C; 1 = C2S
12.168.0.16                        // SourceIPAddress
234.45.0.4                         // DestinationIPAddress
1028                               // SourcePortAddress
80                                 // DestinationPortAddress
422                                // MessageLength
Lexeme Stream >>

GET/exec/cgi-bin/public/perl.exe
HTT/1.1
Host: online.wsj.com
Referrer: http://www.wsj.com/cgi-bin/phf
User-Agent: Mozilla/2.0
```

Base ID lookup block 292 assigns a base ID number and writes the information to base ID memory 298. Alternatively, if an ID number exists for this message, e.g., if this data flow has been seen previously, the base ID number is retrieved from base ID memory 298. The grammar type can be indicated by the device port number or an early token recognition. Once the type of grammar is known from descriptor analysis block 290, the lexical code associated with the identified grammar is downloaded to grammar lex memory 300. Alternatively, the grammar tables may be read from the memory or cache and executed. It should be appreciated that the blocks described in FIG. 9 are pipelined. That is, first in-first out (FIFO) buffers in between the blocks. The message segment is then transmitted to grammar based parsing engine 186 which includes tokenizer 294 and parser 296. Tokenizer 294 converts the message into a token stream, such as the token stream with reference to FIG. 7. Parser 296 identifies non-terminals and valid strings and creates a parse tree. An exemplary parse tree is shown below:

Method = GET
HTTP_URL = /exec/cgi-bin/public/perl.exe
Directory = /exec/cgi-bin/public
Filename = perl
FileExtension — exe
Version = HTTP/1.1
HTTP_HOST = online.wsj.com
HTTP_REFERRER =
http://www.wsi.com/cgi-bin/phf
HTTP_USERAGENT = Mozilla/2.0

An alternative parse tree is shown below through the symbol table structure (SYMTAB) illustrated below:

```
// SYMTAB FOR HTTP/HTML
/****************************************************************/
//-------------- URL ----------------
struct httpRequestUrl {
        /*! Identifies the XPU Event                     */
        symtab_entry            xpuEvent;
        /*! The Meta-Session Id associated with the Message      */
        symtab_entry            metaSessionId;
        /*! The rule header for the                      */
        symtab_entry ruleHeader;
        /*! A general purpose ptr. Right now used as a filler.           */
        symtab_entry            genPurposePtr;
            symtab_entry             HTTP_REQUEST_URL_ST_LENGTH;
        /*! HTTP Method Token.                   */
        symtab_entry            methodToken;
        /*! Un-Normalized URL String.                     */
        symtab_entry            unNorUrlString;
        /*! Normalized URL String                 */
        symtab_entry            normUrlString;
        /*! URL Scheme                    */
        symtab_entry            urlScheme;
        /*! Hostname in the URL                   */
        symtab_entry            urlHost;
        /*! Port number in the URL                        */
        symtab_entry            urlPort;
        /*! Directory string in the URL                   */
        symtab_entry            urlDirectory;
        /*! Full filename in the URL string                       */
        symtab_entry            urlFullFilename;
        /*! Filename only from the URL                            */
        symtab_entry            urlFileNameOnly;
        /*! File extension from the URL                           */
        symtab_entry            urlFileExt;
        /*! Parameters in the URL string.                 */
        symtab_entry            urlParams;
        /*! Parameter names in the URL string                     */
        symtab_entry            urlParameterNames;
        /*! Paramater values in the URL                           */
        symtab_entry            urlParameterValues;
        /*! Path to document in the URL string.                   */
        symtab_entry            urlPath;
        /*! Protocol string in the HTTP message                           */
        symtab_entry            urlProtocol;
        /*! Method in the HTTP message                            */
```

-continued

```
        symtab_entry       urlMethod;
        /*! Exception codes, if any, in this symbol table.        */
        symtab_entry       httpUrlException;
};
//--------------- HTTP REQUEST HEADER -----------------
/***********************/
struct httpRequestHeaders {
        symtab_entry       xpuEvent;
        symtab_entry       metaSessionId;
        symtab_entry       ruleHeader;
        symtab_entry       genPurposePtr;
        symtab_entry       HTTP_REQUEST_HDRS_ST_LENGTH;
        symtab_entry       allHeaders;
        symtab_entry       dayInDate;
        symtab_entry       dateInDate;
        symtab_entry       timeInDate;
        symtab_entry       timezoneInDate;
        symtab_entry       cookies;
        symtab_entry       httpReqHdrException;
};
//--------------- HTTP RESPONSE HEADER -----------------
/******************************/
struct httpResponseHeaders {
        symtab_entry       xpuEvent;
        symtab_entry       metaSessionId;
        symtab_entry       ruleHeader;
        symtab_entry       genPurposePtr;
        symtab_entry       HTTP_RESPONSE_HDRS_ST_LENGTH;
        symtab_entry       statusCode;
        symtab_entry       statusMessage;
        symtab_entry       allHeaders;
        symtab_entry       dayInDate;
        symtab_entry       dateInDate;
        symtab_entry       timeInDate;
        symtab_entry       timezoneInDate;
        symtab_entry       cookies;
        symtab_entry       anchorHrefs;
        symtab_entry       httpRespHdrException;
};
//--------------- HTML BODY SYMTAB -----------------
/***********************/
struct htmlBody {
        symtab_entry       xpuEvent;
        symtab_entry       metaSessionId;
        symtab_entry       ruleHeader;
        symtab_entry       genPurposePtr;
        symtab_entry       HTML_BODY_ST_LENGTH;
        symtab_entry       htmlFormsParameterNames;
        symtab_entry       htmlFormsParameterValues;
        symtab_entry       htmlFormsHiddenFieldsNames;
        symtab_entry       htmlFormsHiddenFieldsValues;
        symtab_entry       body;
        symtab_entry       htmlBodyException;
};
// SYMTAB FOR SMTP
/*******************************************************/
//--------------- EMAIL CMD -----------------
typedef struct {
        symtab_entry xpuEvent;          //holds the smtpEvent SMTP_CMD
        symtab_entry metaSessionId;     //session id not important for the initial test
        symtab_entry ruleServiceQ;
        symtab_entry genPurposePtr;
        symtab_entry CMDST_LENGTH;      //length of the symbol table itself
        symtab_entry cmdToken;          //command reduced to an integer token
        symtab_entry fullCmdString;     // ptr to string
        symtab_entry cmd;      //ptr to null-terminated string for command alone
        symtab_entry smtpCmdException; //no exceptions regarding the SMTP command
        symtab_entry cmdParams;         // ptr to null-terminated string containing command //parameters
        symtab_entry cmdStringLen;      //length of SMTP command with params and CRLF
} smtpCmdST;
//--------------- EMAIL HEADER -----------------
typedef struct {
        symtab_entry xpuEvent;//holds the smtpEvent EMAIL_HEADERS_END
        symtab_entry metaSessionId;
        symtab_entry ruleServiceQ;
        symtab_entry genPurposePtr;
        symtab_entry HDRST_LENGTH;
```

-continued

```
    symtab_entry receivedHdr; // string as it appears in the header
    symtab_entry mailFromHdr;// full header string null-terminated
    symtab_entry mailFromUsername;// null-terminated string of username only
    symtal_entry mailFromDomain;// null-term string of domain only
    symtab_entry numFromAddresses;// total number of From addresses
    symtab_entry to;
    symtab_entry dstDomains; //array of domain strings from CC, BCC, TO
    symtab_entry dstUsernames;        //array of username strings from CC, BCC, TO
    symtab_entry numDstAddresses;// combined size of TO, CC, BCC
    symtab_entry cc;
    symtab_entry bcc;
    symtab_entry dstAddresses;        //array of full emailaddr strings from CC, BCC, TO
    symtab_entry returnPath;
    symtab_entry replyTo;
    symtab_entry subject;
    symtab_entry messageId;
    symtab_entry date;
    symtab_entry dayInDate; // day string from Date hdr
    symtab_entry dateInDate; // date string from Date hdr
    symtab_entry timeInDate; //time string from Date hdr
    symtab_entry timezoneInDate;    // timezone string from Date hdr
    symtab_entry allHeaders; // all chars in all headers in sequence
    symtab_entry contentType;       //content-type converted to an Id
    symtab_entry     hdrException;
    symtab_entry boundaryMarker;    //NULL if not present
    symtab_entry contentXferEnc; //header transfer encoding converted to an Id.
} mailHdrST;
//--------------- EMAIL BODY -----------------
typedef struct {
    symtab_entry xpuEvent;//holds the smtpEvent EMAIL_BODY_END
    symtab_entry metaSessionId;
    symtab_entry ruleServiceQ;
    symtab_entry genPurposePtr;
    symtab_entry BODYST_LENGTH;   //length of sym table
    symtab_entry contentType;       //body content type as int
    symtab_entry contentXferEnc;    //body transfer encoding as int
    symtab_entry size;              //length of email body excluding attachments
    symtab_entry bodyException;     //exception code while processing body in Yantra
    symtab_entry body;              //linked list of buffers holding body text
} mailBodyST;
//--------------- EMAIL ATTACHMENT -----------------
typedef struct {
    symtab_entry xpuEvent;// ;//holds the smtpEvent EMAIL_ATTACHMENT_END
    symtab_entry metaSessionId;
    symtab_entry ruleServiceQ;
    symtab_entry genPurposePtr;
    symtab_entry ATTST_LENGTH; //length of sym table
    symtab_entry contentType;
    symtab_entry contentXferEnc;
    symtab_entry attachmentFilename;// null if not present
    symtab_entry attachmentFileExt;// null if not present
    symtab_entry fullFilename;// null if not present
    symtab_entry isLastAttachment;    //1 if this is the symbol table for the last attachment
    symtab_entry size;              //length of attachment
    symtab_entry attException;       //exception codes in processing attachment in Yantra
    symtab_entry attachment;    //linked list of buffers holding body text
```

Still referring to FIG. 9, the message is then transmitted to state and rule execution block 188. State and rule execution block 188 includes meta session lookup block 304, rule lookup block 308, state update block 312 and rule execute block 316. Meta session lookup block 304 is associated with meta session state index 306, state update block 312 is associated with meta session database memory 314, rule lookup block 308 is associated with rules index memory 310 and rule execute block is associated with rules database memory 318. In one embodiment, the state and rule execution block includes four processors, where each processor is a multi-threaded processor and each processor is configured to execute the rules as illustrated with reference to FIG. 14. Exemplary rules and actions associated with semantic processing are listed below in Tables 1 and 2. It should be appreciated that each of the processors of the SPU system has access to the primitive instructions of TABLES 1 and 2, which are built around strings. In one embodiment, the primitives are built into hardware and translate into a single semantic processing unit instruction. Furthermore, the lists of primitive instructions is exemplary and not meant to be exhaustive.

TABLE 1

STRING OPERATIONS

StringInString
StringCompare
FindInList
FindInRegExList
StringLength
StringCopy

TABLE 2

ACTIONS

InsertString
DeleteString
InsertCookie
Drop
Redirect
Shun
Log
Alert
SendMessage

Figure 10:
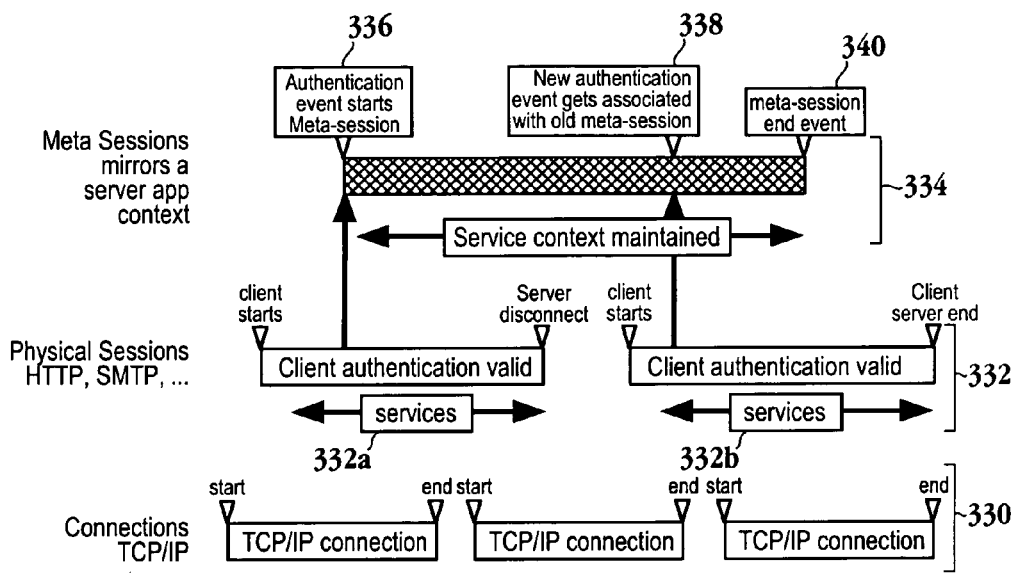
FIG. 10 is a schematic diagram of a meta session model in accordance with one embodiment of the invention.

Meta session lookup block 304 creates a session ID and index for a new meta session. Additionally, space is allocated in meta session state index memory 306. Alternatively, if the meta session is associated with an old meta session, then the new authentication event is associated with the old meta session. FIG. 10 is a schematic diagram of a meta session model in accordance with one embodiment of the invention. It should be appreciated that a meta session maintains information that is invariant across different connections or physical sessions. As FIG. 10 illustrates, multiple TCP/IP connections 330 are included in one HTTP, SMTP, etc. session 332. Then on top of the physical sessions, meta session 334 may include multiple HTTP, SMTP, etc. sessions 332. For example, multiple physical sessions from a hacker may be associated into a meta session or meta session 334 may be associated with a shopping cart transaction related to an e-commerce application. That is, even if an HTTP session 332 has timed out, the next time the same user logs in, the previous transactions of the user are available through the association with the meta session and the storage in meta session state index 304. It should be appreciated that a meta session may be based on cookies being exchanged, a host name, a client name, a URL, a HTTP session ID, etc. Accordingly, authentication events 336 associated with these bases (cookies, host name, client name, URL, HTTP session ID, etc.) may initiate a meta session. During meta session 334 it may be decided to associate a new authentication event from a second physical session 332b with a previous (old) meta session as indicated at point 338 where a service context is maintained between physical session 332a and 332b. Exemplary meta session end events 340, i.e., rules for ending a persistent connection, include HTTP_CONN_CLOSE, HTIP_RESP_GE_400, a timeout, an event triggered by rule execution block or action execution block, etc.

Figure 11:
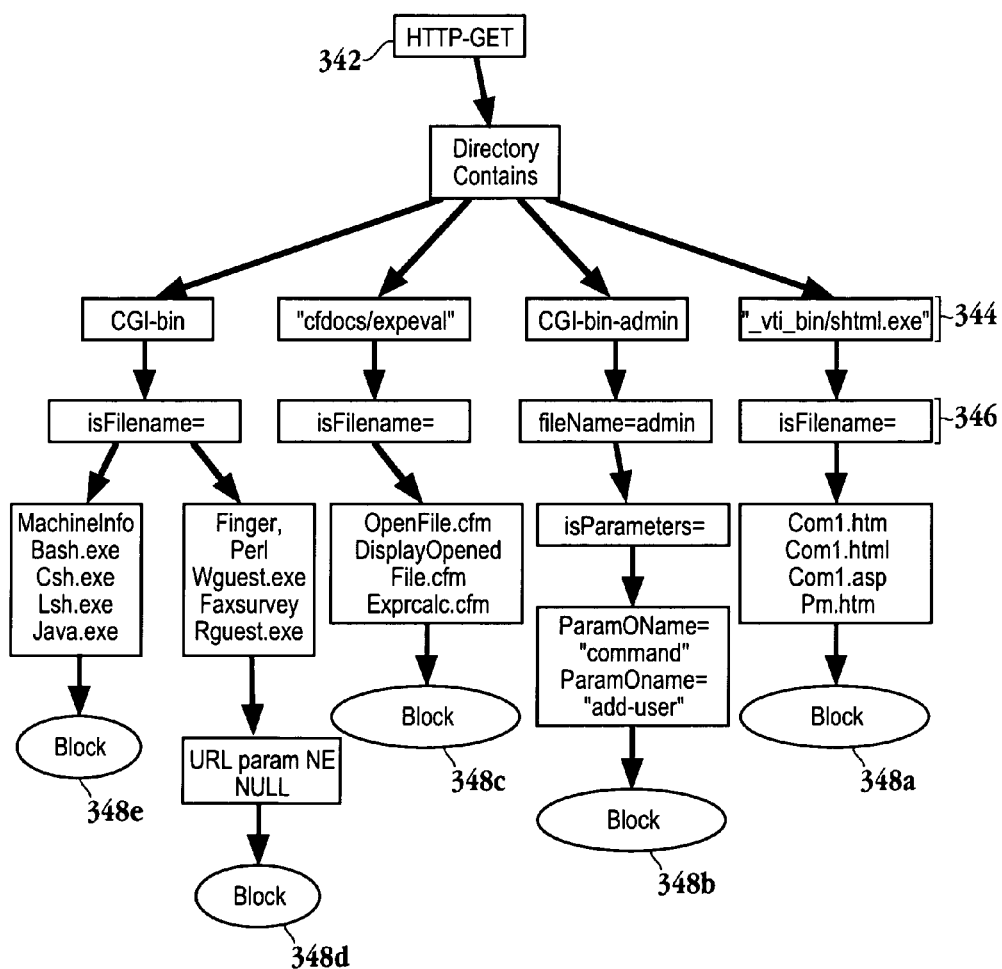
FIG. 11 is a schematic diagram representing a decision tree associated with an HTTP GET command in accordance with one embodiment of the invention.

Returning to FIG. 9, Rule lookup block 308 is executed simultaneously with meta session lookup block 304. Here, a rule parameter is created from all the parameters and a pointer to the rule body is determined. In one embodiment, procedural/declarative rule predicates are looked up here. FIG. 11 is a schematic diagram representing a decision tree associated with an HTTP GET command in accordance with one embodiment of the invention. Here, by examining the tokens of a URL, such as the tokens associated with the URL of FIG. 7, a subset of rules is identified. The subset of rules is typically a small subset of the many rules defined in the rules index memory, thereby allowing for the efficient determination of applicable rules for a message. HTTP command 342 is examined according to the various directory names 344 of the HTTP command. Filenames 346 associated with directory names 344 further define an applicable set of rules. Certain parameters or file extensions may also be looked at to eventually reach blocks 348a-e which define a subset of rules to be applied to the message, thereby defining a tree type structure for rule index memory 310 of FIG. 9.

Figure 12:
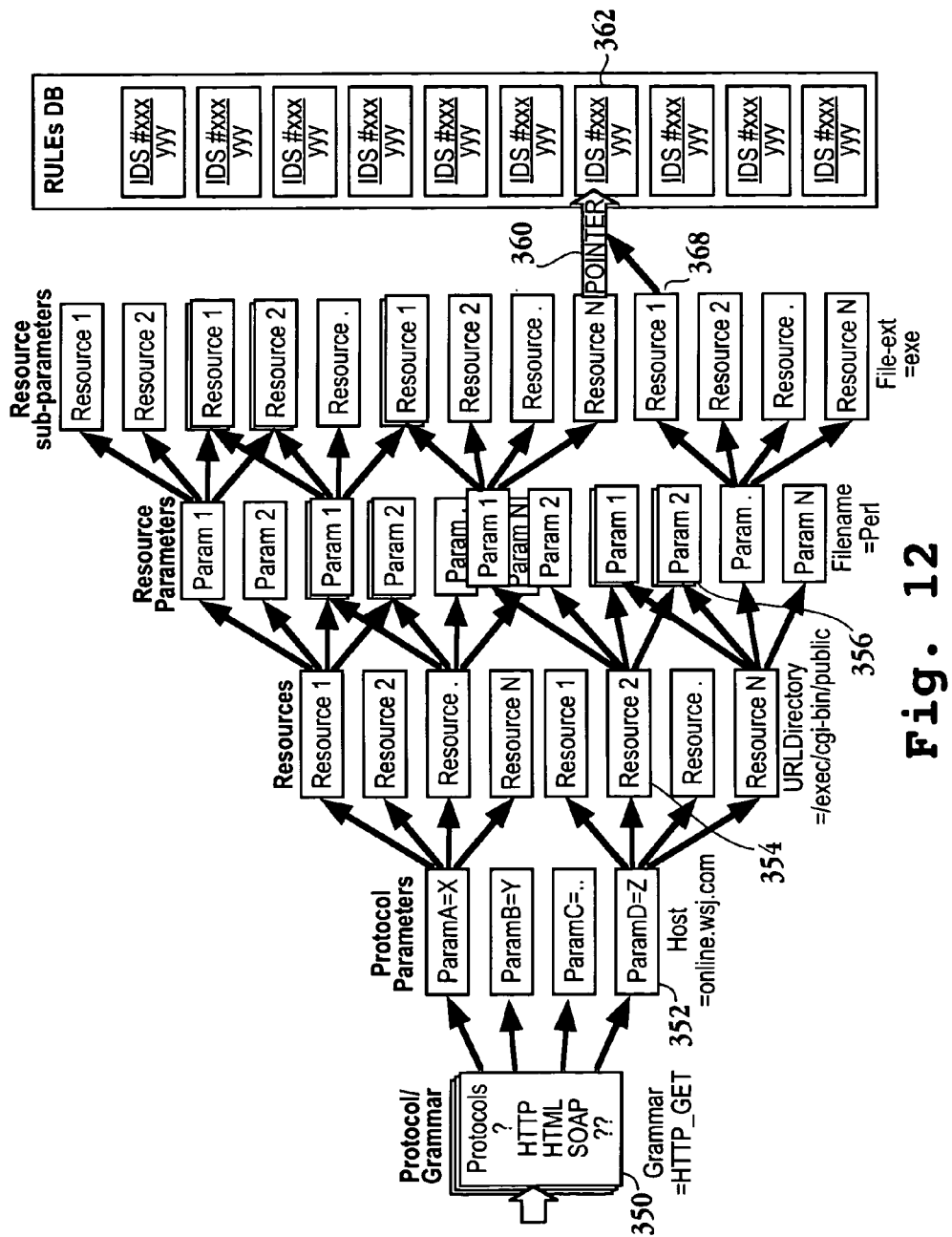
FIG. 12 is a schematic diagram further defining the rule index trees in accordance with one embodiment of the invention.

FIG. 12 is a schematic diagram further defining the rule index trees in accordance with one embodiment of the invention. The grammar of the incoming message identified through the grammar based parsing engine is used as a starting point. Thus, box 350 is associated with a HTTP_GET grammar. It should be appreciated that different types of grammar, e.g., hypertext mark-up language (HTML), simple object access protocol (SOAP), simple mail transfer protocol (SMTP), etc., would result in various branches of a protocol specific rule index tree. Here, the HTTP_GET grammar points to box 352 where the host of the GET command is looked at next to determine the next branch. Here, where the newspaper of the GET command of FIG. 7 is THE WALL STREET JOURNAL™, the host may be online.wsj.com, which would point to box 354. It should be appreciated that the tokens discussed with reference to FIG. 7 are being evaluated here. Furthermore, if the grammar is based on SMTP, then a different set of tokens, such as tokens associated with email addresses, and then the subject associated with the email, and so on are used, rather than the host address associated with box 352.

Continuing with FIG. 12, a hash value of the host address may be used to arrive at box 354. The URL directory is then looked at, which points to box 356. Then the filename and the file extension are evaluated which results in moving to box 358 and pointer 360, pointing to rule subset 362. In one embodiment, the file extension may have a suitable number of pointers associated with the file extension so that a full compare may be used to define pointer 360 leading to rule subset 362. Thus, a combination of hashing and full compares are utilized to arrive at the applicable rule subset, i.e., parse through the index tree.

Returning to FIG. 9, state update block 312 updates the communication state and writes to meta session database memory 314 to update an existing meta session or initiate a new meta session. Rule execution block 316 evaluates the rule predicates and finds a match in rule database memory 318. Action execution engine 190 performs actions on the message per the identified rules. For example, if the message contains a suspect .exe file or practical extraction and reporting language (Perl) script, the action may be to drop the message or quarantine the message and send an alert message to the server, through Queue block 192. It will be apparent to one skilled in the art that the message can be sent to a trash bin when the message is dropped in one embodiment of the invention. Queue state memory 192 is configured to store items to be sent out through queue 192. It should be appreciated that during the grammar based processing and the state and rile execution processing, a copy of the message is held in message buffer memory 322 for retrieval by action execution engine 190 and queue block 192. In one embodiment, the rules engine provides direct access to any variable within the payload of a message through grammar based access by prepending the key word message, e.g., message.smtpCommand.

Figure 13:
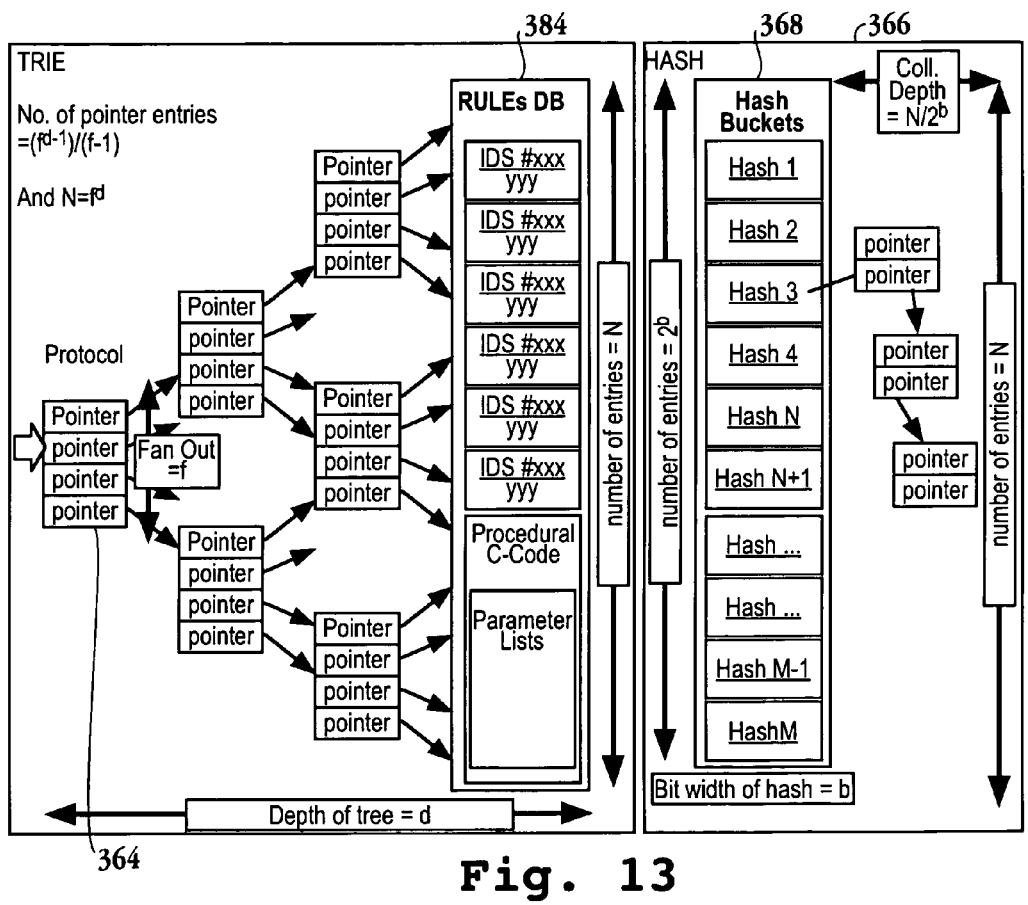
FIG. 13 is a schematic diagram of the index tree data structures in memory in accordance with one embodiment of the invention.

FIG. 13 is a schematic diagram of the index tree data structures in memory in accordance with one embodiment of the invention. Here, a set pointers 364 fans out to other sets of pointers based on the grammar type, in one embodiment. It should be appreciated that the multiple sets of pointers define a tree node. Box 366 represents the hash process that may be used to efficiently walk through the tree node in another embodiment of the invention. As described above, a combination of hash processes and exact match processes are used to arrive at the set of rules in rule database 384. In one embodiment, hash processes are applied from the first set of pointers to the final set of pointers and an exact match is performed to identify the specific set of rules in rule database 384 associated with the message. It will be apparent to one skilled in the art that the hash process of box 366 includes creating a hash value from a key. The hash value is associated with a hash value in hash bucket 368. The associated hash value eventually points to the data structure.

Figure 14:
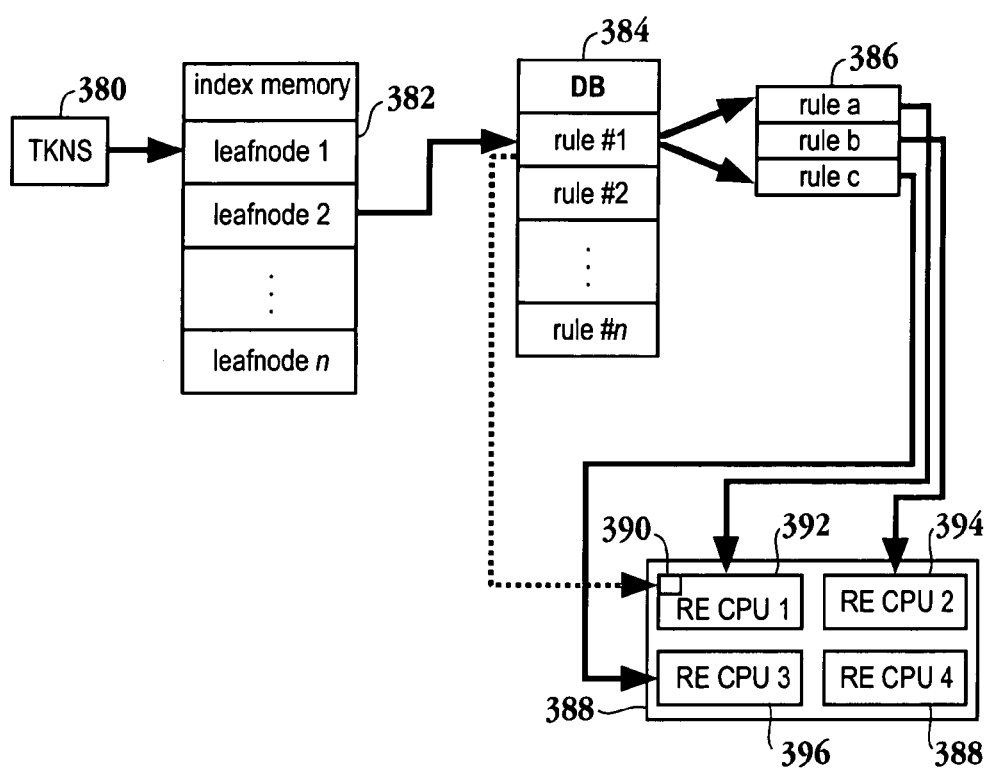
FIG. 14 is a schematic diagram illustrating the indexing methodology in accordance with one embodiment of the invention.

FIG. 14 is a schematic diagram illustrating the indexing methodology in accordance with one embodiment of the invention. Here, a set of tokens 380, such as the tokens with reference to FIG. 7, is examined and a tree data structure in memory 382, such as the index tree data structure of FIG. 12, is walked through as described above. For example, a state machine may read the memory to go through the tree walk. At the end of the tree walk, a leaf node, such as leaf node 2 is identified. Leaf node 2 is associated with a numeric value, which points to rule # 1. The numeric value is then transmitted to another read machine associated with the rule execution engine 388. The read machine takes the numeric value, which is associated with rule # 1 of rule database 384, and places rule # 1 in code memory 390 of read engine CPU 392. In one embodiment, read engine 388 includes 4 rule engine CPUs. It should be appreciated that rule # 1 may include rule a, rule b, and rule c of block 386. In this embodiment, rule a can be sent to rule engine CPU1 (RECPU1) 392, rule b sent to RECPU2 394 and rule c sent to RECPU3 396. Thus, multiple rules can be divided up to run simultaneously on an array of parallel engines according to a scheduling algorithm.

Figure 15:
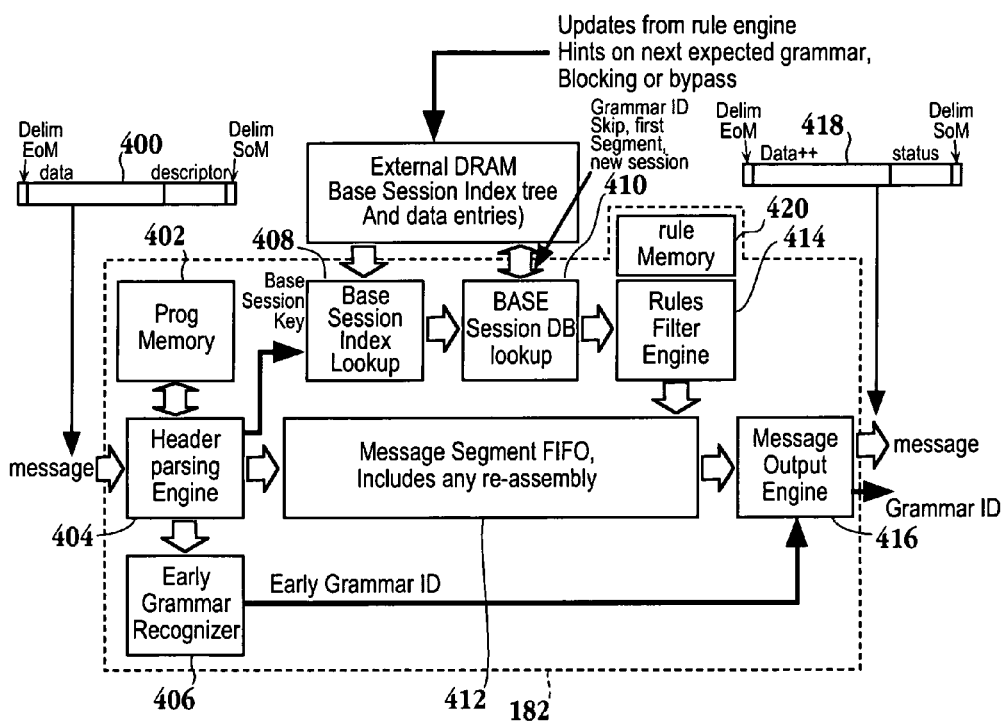
FIG. 15 is a more detailed schematic diagram of the message characterization block of the semantic processing unit in accordance with one embodiment of the invention.

FIG. 15 is a more detailed schematic diagram of the message characterization block of the semantic processing unit in accordance with one embodiment of the invention. Message 400, which includes a descriptor and data segment, is received by header parsing engine 404. Header parsing engine 404 is in communication with early grammar recognizer 406, message segment first in first out (FIFO) buffer 412, base session index look up block 408 and program memory 402. Message 400 is stored in message segment FIFO 412. A base session key is received by base session look up block 408 from header parsing engine 404. Base session index lookup block 408 is in communication with base section data base lookup block 410. Blocks 408 and 410 are in communication with external dynamic random access memory (DRAM) 422. External DRAM 422 includes a definition of the base session index tree and base session database entries. Base session database lookup block 410 is in communication with rules filter engine 414 which is associated with rule memory 420. Rules filter engine 414 applies the rules to the message in message segment FIFO 412. The message is then sent from FIFO 412 to message output engine block 416. Message output engine block 416 then outputs the message and a grammar ID. In one embodiment, grammar ID is determined by early grammar recognizer 406. As discussed above, the grammar type, i.e., grammar ID, is determined by looking at the descriptor information of the message segment. Message 418 is thus modified by processing within message characterization block 182. Here, message 418 includes status and data segments as compared to incoming message 400 having descriptor and data segments.

Figure 16:
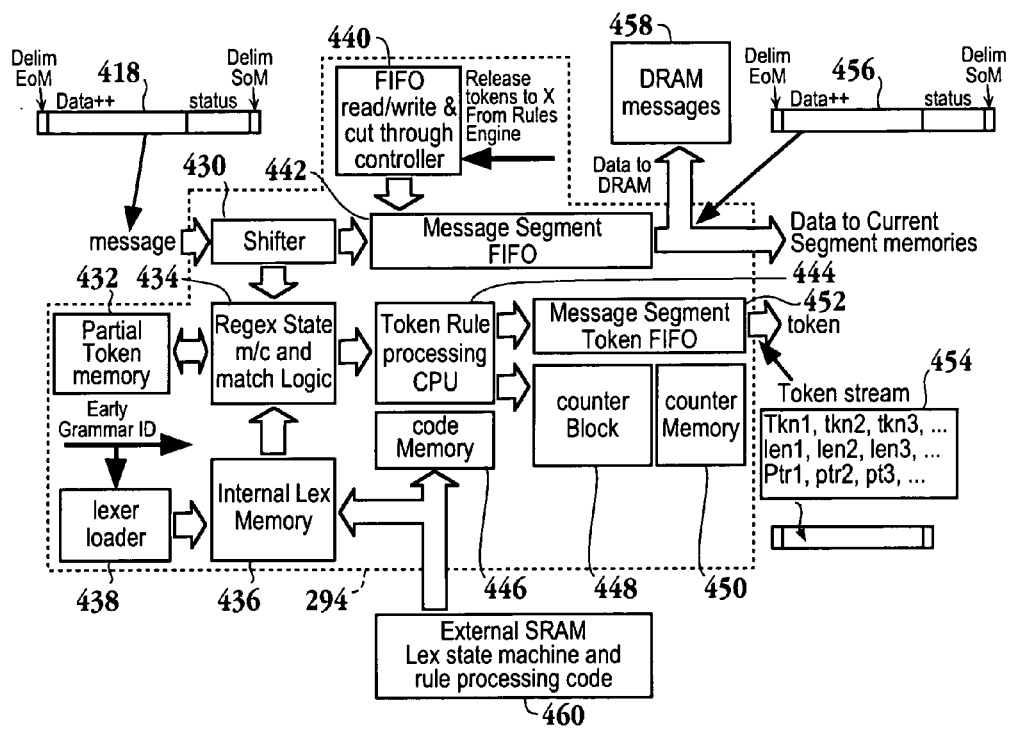
FIG. 16 is a more detailed block diagram of the tokenizer of the semantic processing unit in accordance with one embodiment of the invention.

FIG. 16 is a more detailed block diagram of the tokenizer of the semantic processing unit in accordance with one embodiment of the invention. Here, message 418, which was output from message characterization block 182 of FIG. 15, is input to shifter 430 of tokenizer block 294. Shifter 430 is in communication with message segment FIFO 442 which transmits the message to DRAM 458 and other current segment memories. Release tokens from rules engine are delivered to FIFO read/write and cut through controller 440, which is in communication with message segment FIFO 442. Shifter 430 also transmits information to regular expression state machine and match logic block 434. Regular expression state machine and match logic block 434 is in communication with partial token memory 432. Regular expression state machine and match logic block 434 provides information to token rule processing CPU 444, which is in communication with message segment token FIFO 452. Additionally, token rule processing CPU 444 provides information to counter block 448 which is associated with counter memory 450. Message segment token FIFO 452 outputs tokens in the form of token stream 454. Grammar ID from FIG. 15 is provided to Lexer loader 438 of FIG. 16. Lexer loader 438 is in communication with internal Lexical memory block 436, which in turn is in communication with regular expression state machine and match logic block 434. Internal Lexical memory 436 receives data from external static random access memory (SRAM) 460. External SRAM 460 includes Lexical state machine and rule processing code. In one embodiment, external SRAM 460 provides data to code memory 446.

Figure 17:
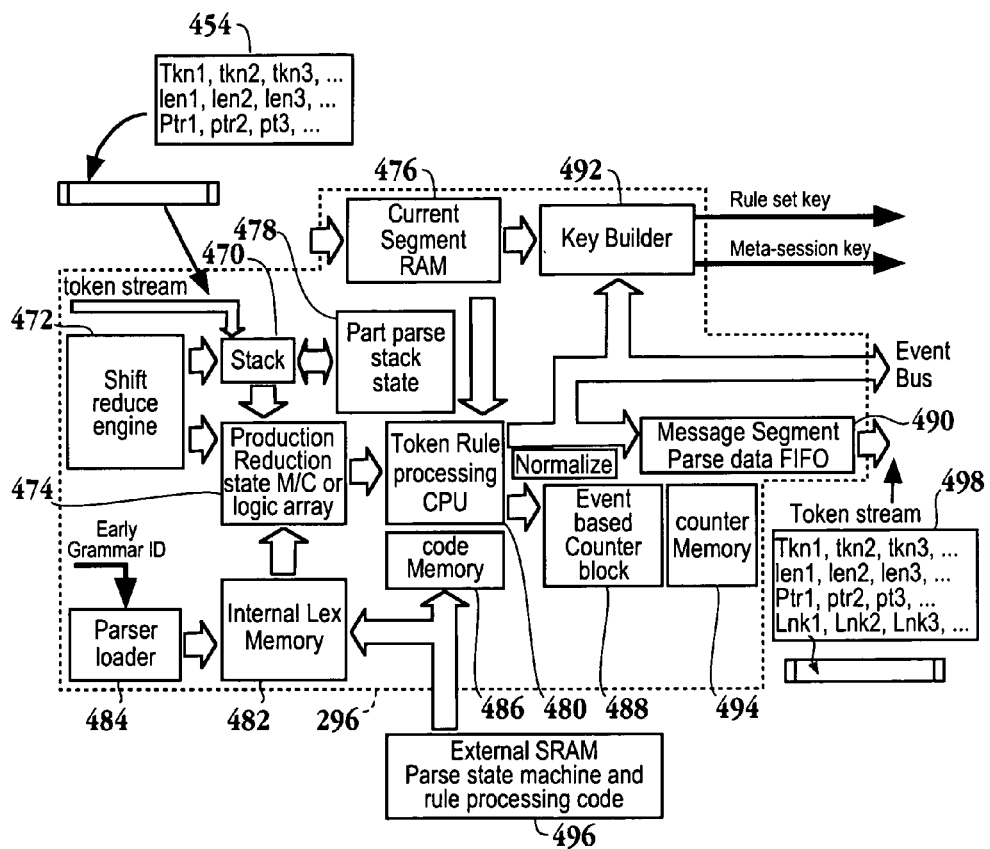
FIG. 17 is a more detailed block diagram of the parser of the semantic processing unit in accordance with one embodiment of the invention.

FIG. 17 is a more detailed block diagram of the parser of the semantic processing unit in accordance with one embodiment of the invention. Here, token stream 454 of FIG. 16 is received by stack 470 of parser 296. Token stream 454 includes the identification of the token, the length of the token and a pointer to the message. Stack 470 is in communication with parse stack state block 478, production reduction state machine or logic array 474 and shift reduce engine 472. In one embodiment, stack 470 is configured in a last in first out (LIFO) configuration. The message is received into current segment random access memory 476, which is in communication with key builder 492. Key builder 492 generates a rule set key and a meta session key. Grammar ID is received by parser loader block 484 which is in communication with internal parser memory block 482. Internal parser memory block 482 is in communication with production/reduction state machine or logic array 474. Production/reduction state machine or logic array 474 delivers the token stream to toke rule processing CPU 480. Token rule processing CPU is in communication with current segment random access memory 476 so as to have access to the message. Token rule processing CPU 480 is in communication with message segment parse data structure FIFO 490. In addition, token rule processing CPU 480 is in communication with event based counter block 488 which is associated with counter memory 494. In addition, token rule processing CPU 480 is associated with code memory 486, which is configured to receive data from external SRAM 496. In one embodiment, external SRAM 496 includes parse state machine and rule processing code. Message segment parse data structure FIFO 490 is configured to output a token parse tree 498.

Figure 18:
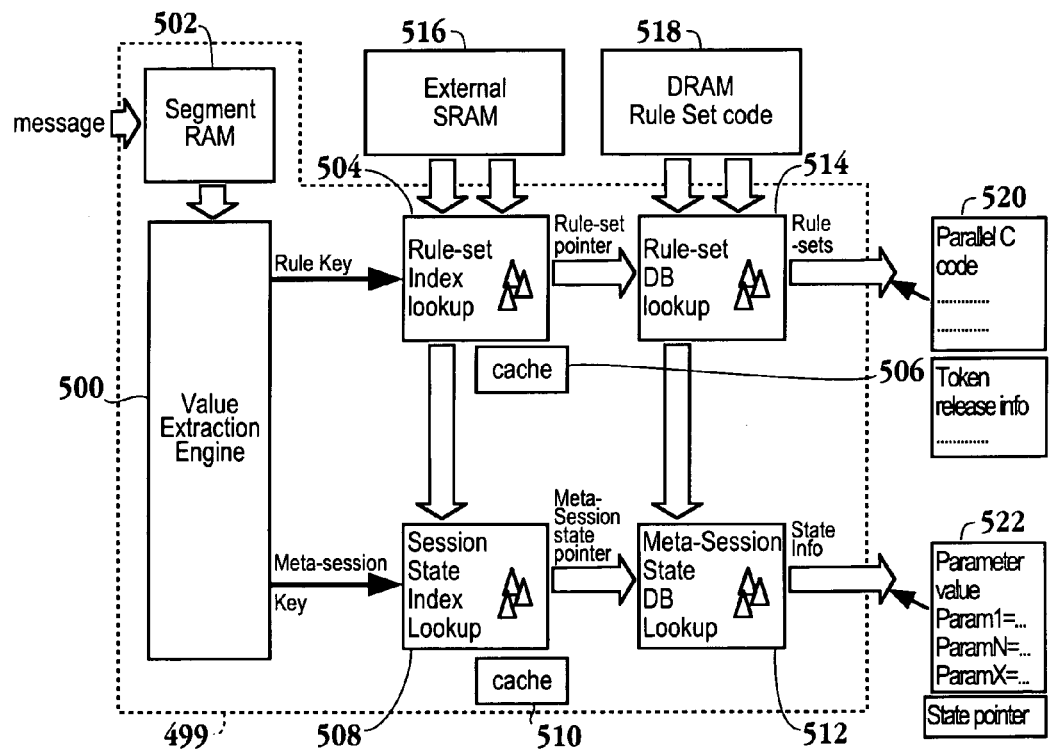
FIG. 18 is a more detailed block diagram of the meta session lookup block and rule lookup block of the semantic processing unit in accordance with one embodiment of the invention.

FIG. 18 is a more detailed block diagram of the meta session lookup block and rule lookup block of the semantic processing unit in accordance with one embodiment of the invention. Here, the message is received by segment RAM block 502, which is in communication with value extraction engine block 500. Value extraction block 500 outputs rule key and meta session key. Rule key is delivered to rule set index lookup block 504, while meta session key is delivered to session state index lookup block 508. Both blocks 504 and 508 are associated with cache memories 506 and 510, respectively. External SRAM 516 provides data to rule set index lookup block 504 and session state index lookup block 508. DRAM 518 provides data for rule set data base lookup block 514 and meta session state database lookup block 512. Rule set index lookup block 504 receives rule key and outputs a rule set pointer to rule set data base lookup block 514, which in turn outputs rule sets 520. Session state index lookup block 508 receives meta session key and outputs meta session state pointer to meta session state data base lookup block 512. Meta session state index lookup block 512 outputs state information 522.

Figure 19:
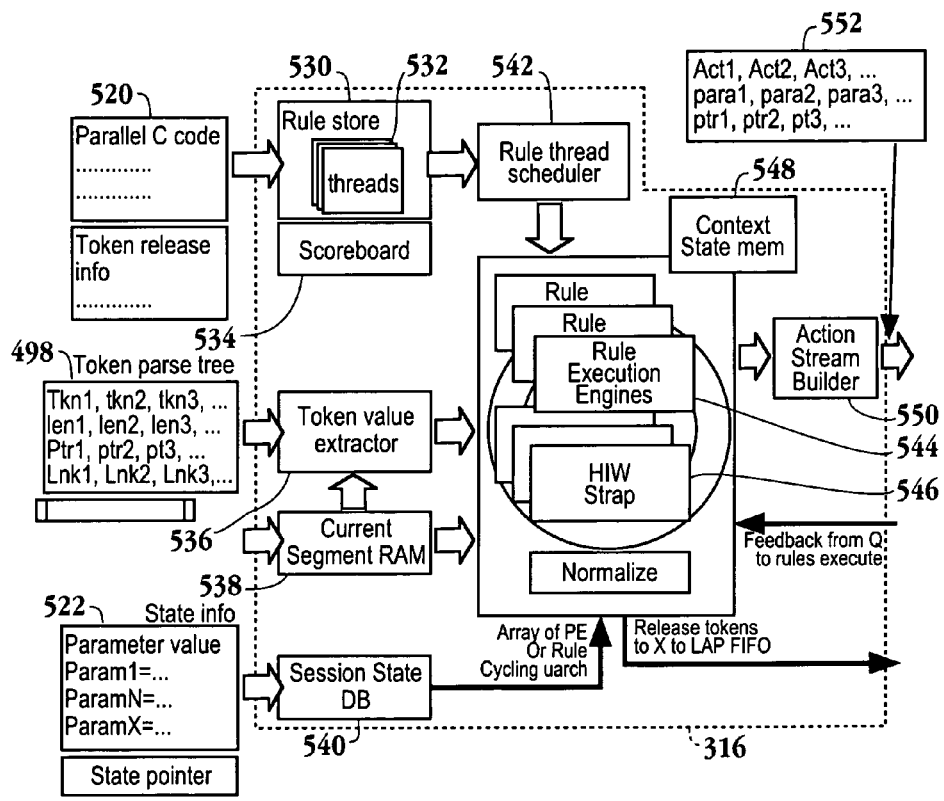
FIG. 19 is a more detailed block diagram of the rule execution engine of the semantic processing unit in accordance with one embodiment of the invention.

FIG. 19 is a more detailed block diagram of the rule execution engine of the semantic processing unit in accordance with one embodiment of the invention. Rule sets 520 from FIG. 18 are received by rule store 530 of rule execution block 316. Rule store 530 includes multiple threads 532 and is in communication with rule threads scheduler 542. Scoreboard 534 is associated with rule store block 530. Rule thread scheduler block 542 schedules the multiple threads and multiple rule execution engines 544 to generate actions 552 through action stream builder 550. Context state memory block 548 is associated with rule execution engines 544. Token parse tree 498 from FIG. 17 is received by token value extractor 536 of rule execution block 316. Token value extractor delivers token parse tree information to rule execution engines 544. The message is received by current segment RAM 538 and is also forwarded to rule execution engines 544. In addition, state information 522 from FIG. 18 delivered to session state data base block 540.

Figure 20:
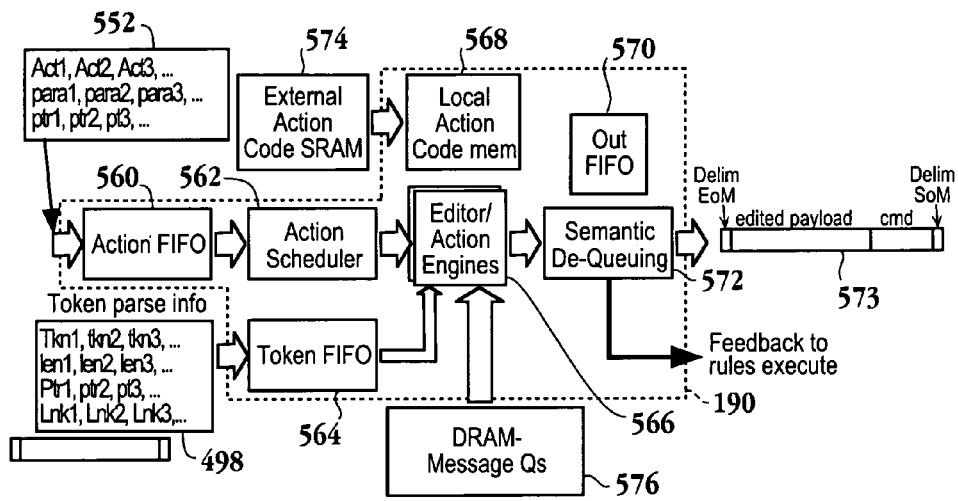
FIG. 20 is a more detailed block diagram of the action execute block of the semantic processing unit in accordance with one embodiment of the invention.

FIG. 20 is a more detailed block diagram of the action execute block of the semantic processing unit in accordance with one embodiment of the invention. Actions 552 from FIG. 19 are delivered to action FIFO 560 of action execution block 190. Action FIFO delivers the actions to action scheduler 562, which in turn, transmits the actions to editor/action engines 566. Editor/action engines 566 is associated with local action code memory 568. Local action code memory block 568 is in communication with external action code SRAM 574 and is configured to receive data from SRAM 574. Token parse information 498 from FIG. 17 is received by token FIFO 564 which in turn delivers the token parse information to editor/action engines 566. Editor/action engines 566 are in communication with DRAM 576. In one embodiment, DRAM 576 includes message queues. Editor/action engines 566 are in communication with semantic de-queuing block 572. Semantic de-queuing block 572 forwards the message to a queue in one embodiment. In addition, semantic de-queuing block 572 provides feedback to rule execution block 316. Message 573, which is output from semantic de-queuing block 572, includes edited payload and command segments.

Figure 21:
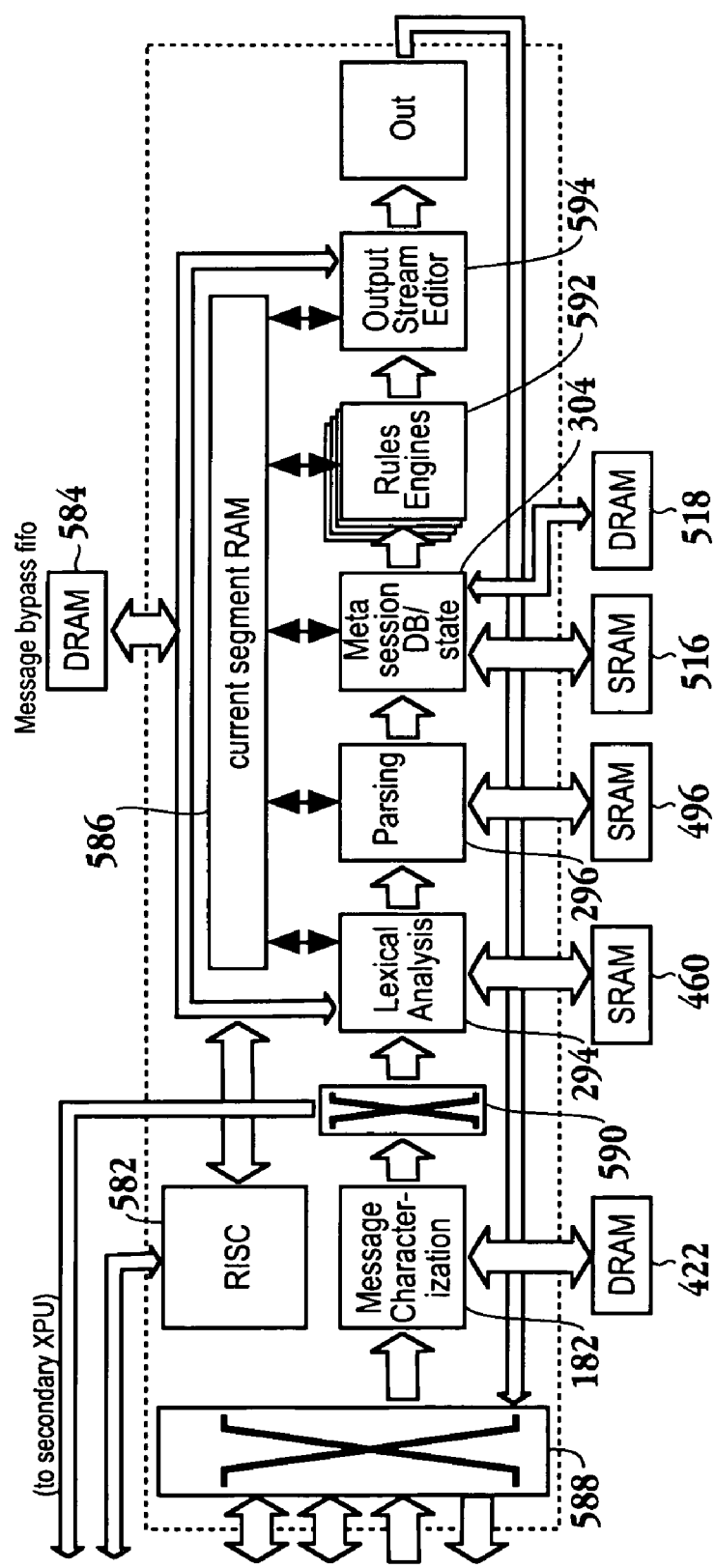
FIG. 21 is a high-level schematic diagram illustrating the memories associated with each of the processing blocks in accordance with one embodiment of the invention.

FIG. 21 is a high-level schematic diagram illustrating the memories associated with each of the processing blocks in accordance with one embodiment of the invention. Here, message characterization block 182 is associated with DRAM 422 while Lexical analysis block 294 is associated with SRAM 460. Parsing block 296 is associated with SRAM 496 while meta session database/state block 304 is associated with SRAM 516 and DRAM 518. Current segment RAM 586 is in communication with each of Lexical analysis block 294, parsing block 296, meta session data base/state block 304, rules engine 592, and output stream editor 594. DRAM 584 is in communication with Lexical analysis block 294 and output stream editor 594. In one embodiment, DRAM 584 acts as a message bypass FIFO.

Figure 22A:
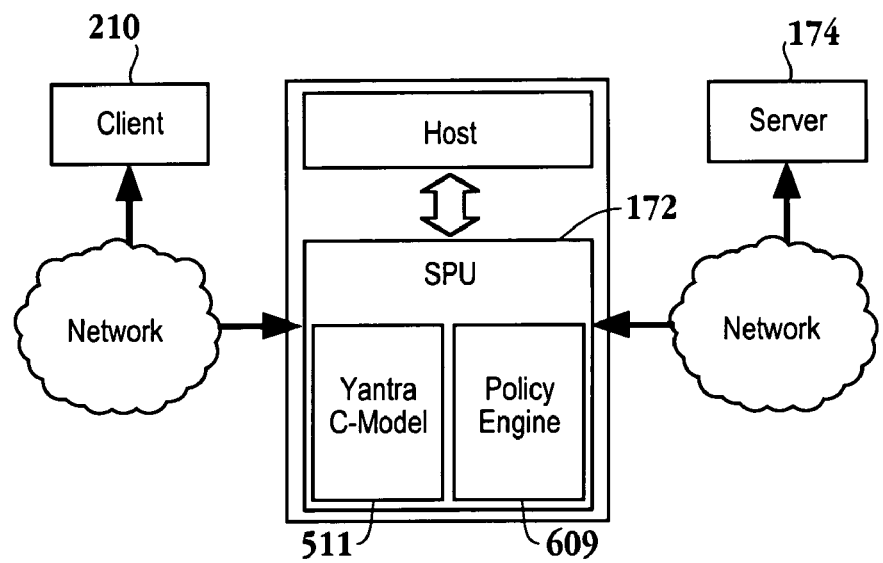
FIG. 22A is a high level schematic diagram of the basic system architecture of an intrusion prevention system in accordance with one embodiment of the invention.

FIG. 22A is a high level schematic diagram of the basic system architecture of an intrusion prevention system in accordance with one embodiment of the invention. Server 174 is in communication with client 210 through a distributed network, e.g., the Internet. It should be appreciated that client 210 may be an internal client from a trusted domain or an external client from an un-trusted domain. In the communication pathway is semantic processing unit (SPU) 172, which includes Yantra C-model block 511 and Policy engine 609. As described herein, a message may be transmitted in segments, e.g., packets, between server 174 and client 210. Semantic processing unit 172 includes logic for analyzing or scanning the message segments, i.e., lexical analyzer, which then creates pieces of the segments thereby defining a token stream. It should be appreciated that the pieces may span message segments. The pieces of the token stream are then manipulated by a parsing block to create a substructure for the pieces, where the substructure may also span massage segments.

Figure 22B:
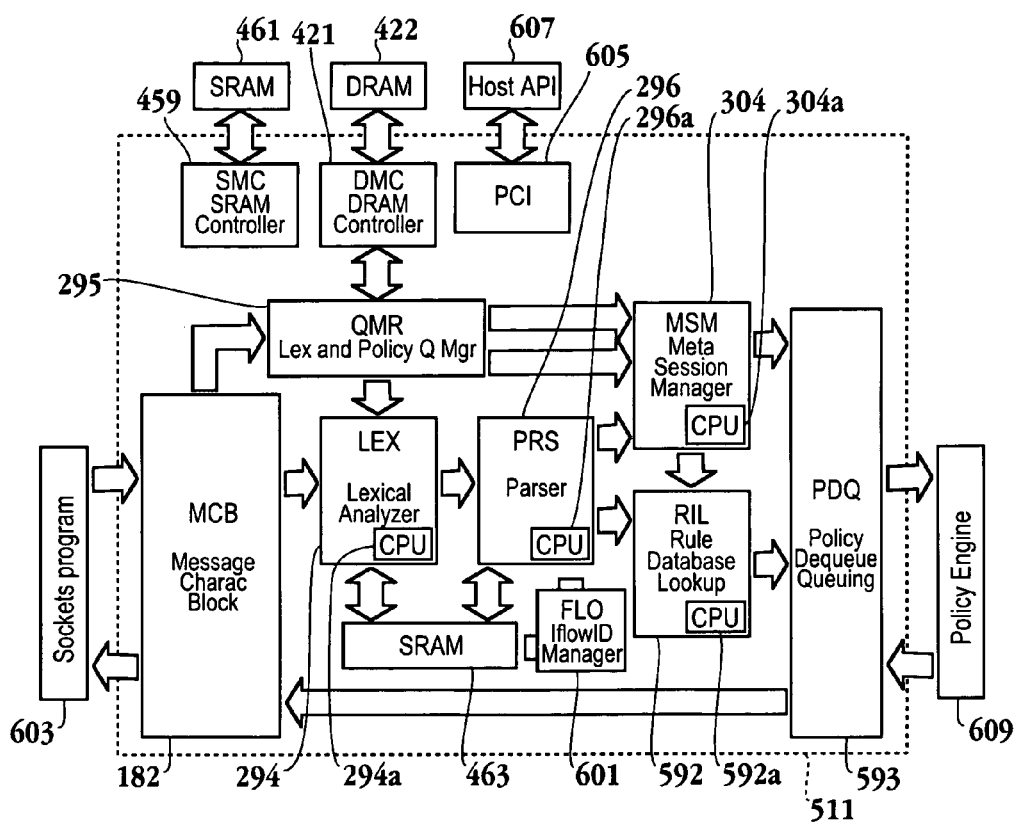
FIG. 22B is a more detailed schematic diagram of the Yantra-C model of FIG. 22A.

FIG. 22B is a more detailed schematic diagram of the Yantra-C model of FIG. 22A. Message characterization block 182 is in communication with socket program block 603 and Lexical analysis block 294, which is in communication with Parsing block 296. Parsing block 296 may output data in parallel to meta session manager 304 and rules engine 592. Meta session manager 304 and rules engine 592 are in communication with each other and with policy de-queue/queue block 593, which in turn is in communication with policy engine 609, as well as message characterization block 182. Lexical analyzer and policy queue manger block 295 is in communication with message characterization block 182, Lexical analysis block 294, meta session manager 304 and DRAM memory controller 421, which is associated with DRAM 422. SRAM memory controller 459 is associated with SRAM 461. Peripheral component interconnect block 605 is in communication with host API 607. Flow ID manager 601 is also included. It should be appreciated that Lexical analysis block 294, Lexical analysis block 294, meta session manager 304 and rules engine 592 are each associated with a processor, as indicated by CPU 294-a, CPU 296-a, CPU 304-a, and CPU 592-a, respectively.

Figure 22C:
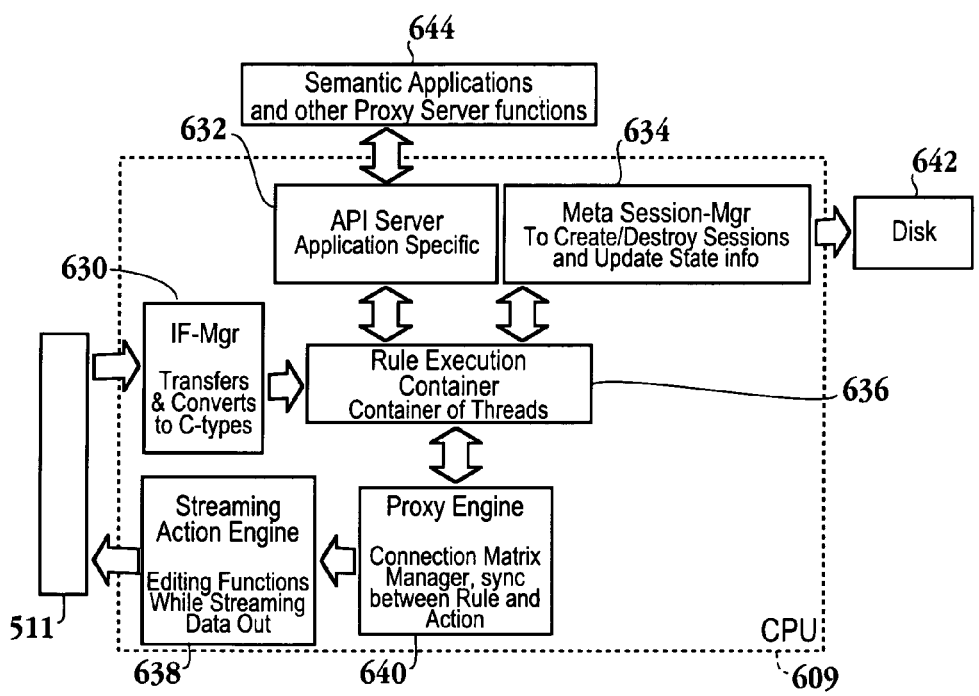
FIG. 22C is a more detailed schematic diagram of the functional blocks associated with the policy engine of FIGS. 21A and 21B.

FIG. 22C is a more detailed schematic diagram of the functional blocks associated with the policy engine of FIGS. 21A and 21B. Policy engine 609 is in communication with block 511 of FIG. 5 and block 644 which encompasses semantic applications and other proxy server functions. Policy engine 609 includes IF manager block 630 which transfers and converts to C-types. IF manager block 630 is in communication with rule execution container block 636 which functions as the container of the threads. Rule execution container block 636 is in communication with API server block 632, Meta session manager block 634, and proxy engine 640. API server block may be configured to be application specific. Meta session manager block 634 includes logic for creating and destroying sessions and updating state information. This information may be stored on storage media 642. Proxy engine 640 includes the connection matrix manager and logic for synchronization between rules and actions. Proxy engine 640 is in communication with Streaming action engine 638 which performs function editing while streaming data out. Streaming action engine 638 is in communication with block 511.

Figure 23:
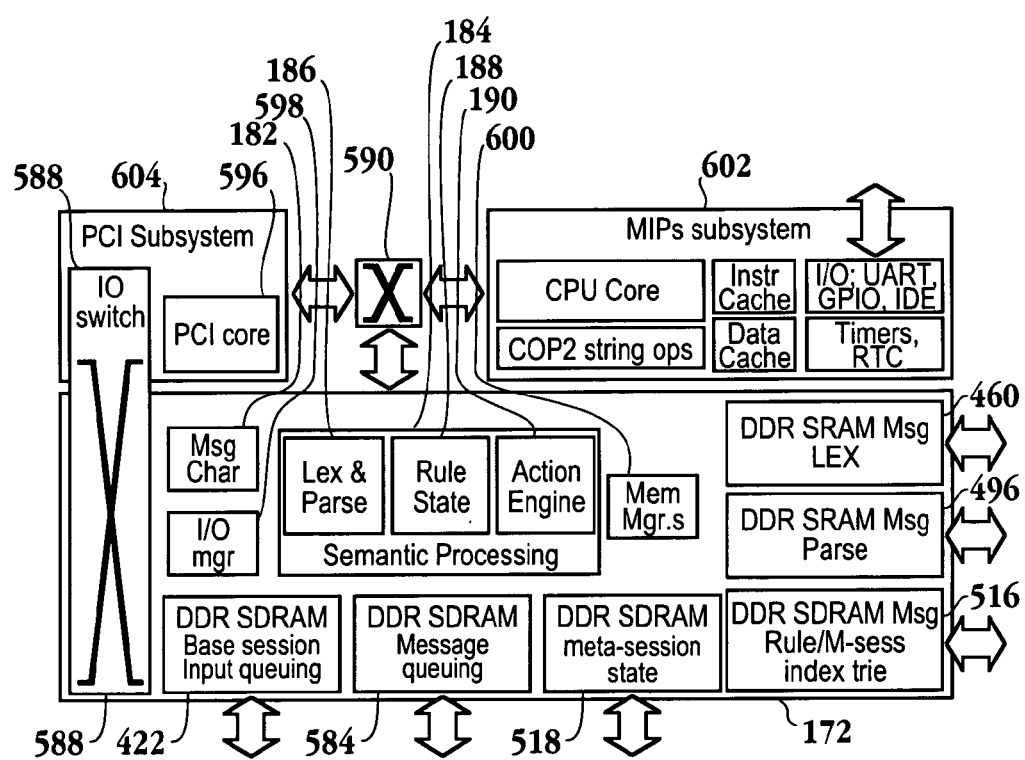
FIG. 23 is a simplified internal block diagram of the layout, without connectivity, of an integrated circuit chip configured to provide intrusion prevention security in accordance with one embodiment of the invention.

FIG. 23 is a simplified internal block diagram of the layout, without connectivity, of an integrated circuit chip configured to provide intrusion prevention security in accordance with one embodiment of the invention. Here, MIPs subsystem 602 is an embedded CPU equivalent to SPU 194 of FIG. 5B. Switch 590 allows communication between MIPs subsystem, 602 and PCI subsystem 604. PCI subsystem includes PCI core 596. SPU system 172 includes message characterization block 182 and semantic processing block 184. Memory managers 600 are included to manages the plurality of memories, SRAM 460, SRAM 496, SRAM 516, DRAM 422, DRAM 584 and DRAM 518, associated with SPU system 172. Input/Output I/O switch 588 provides the interface for communication with external devices.

Figure 24:
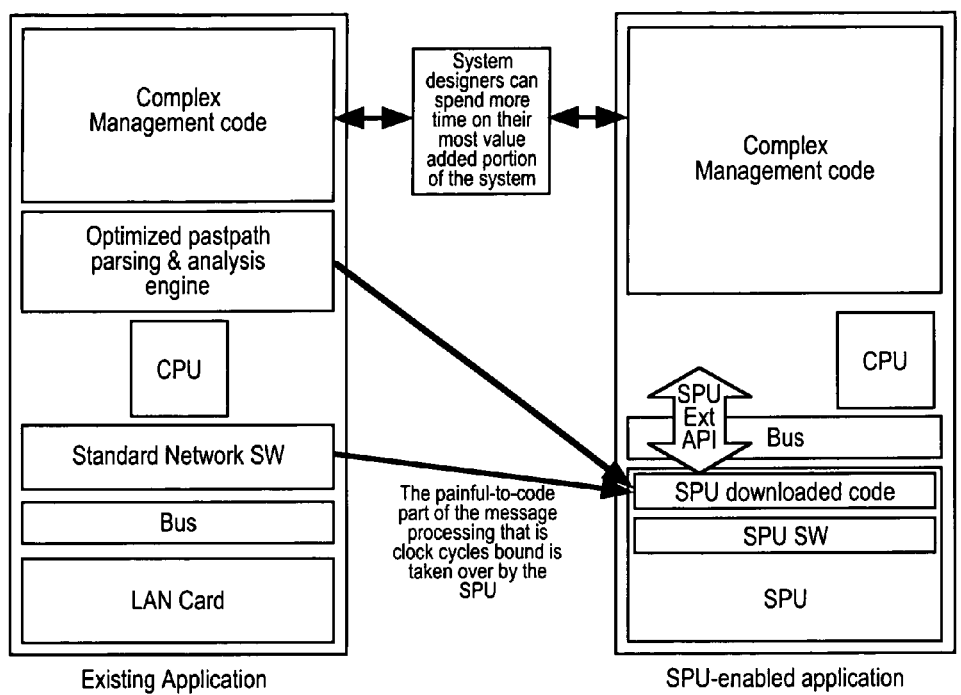
FIG. 24 is a schematic diagram illustrating the migration from existing application to an SPU enabled application.

FIG. 24 is a schematic diagram illustrating the migration from existing application to an SPU enabled application. The SPU takes over the message processing to free up the CPU for other application processing. In addition, system designers are enabled to spend more time on the complex management code.

Figure 25:
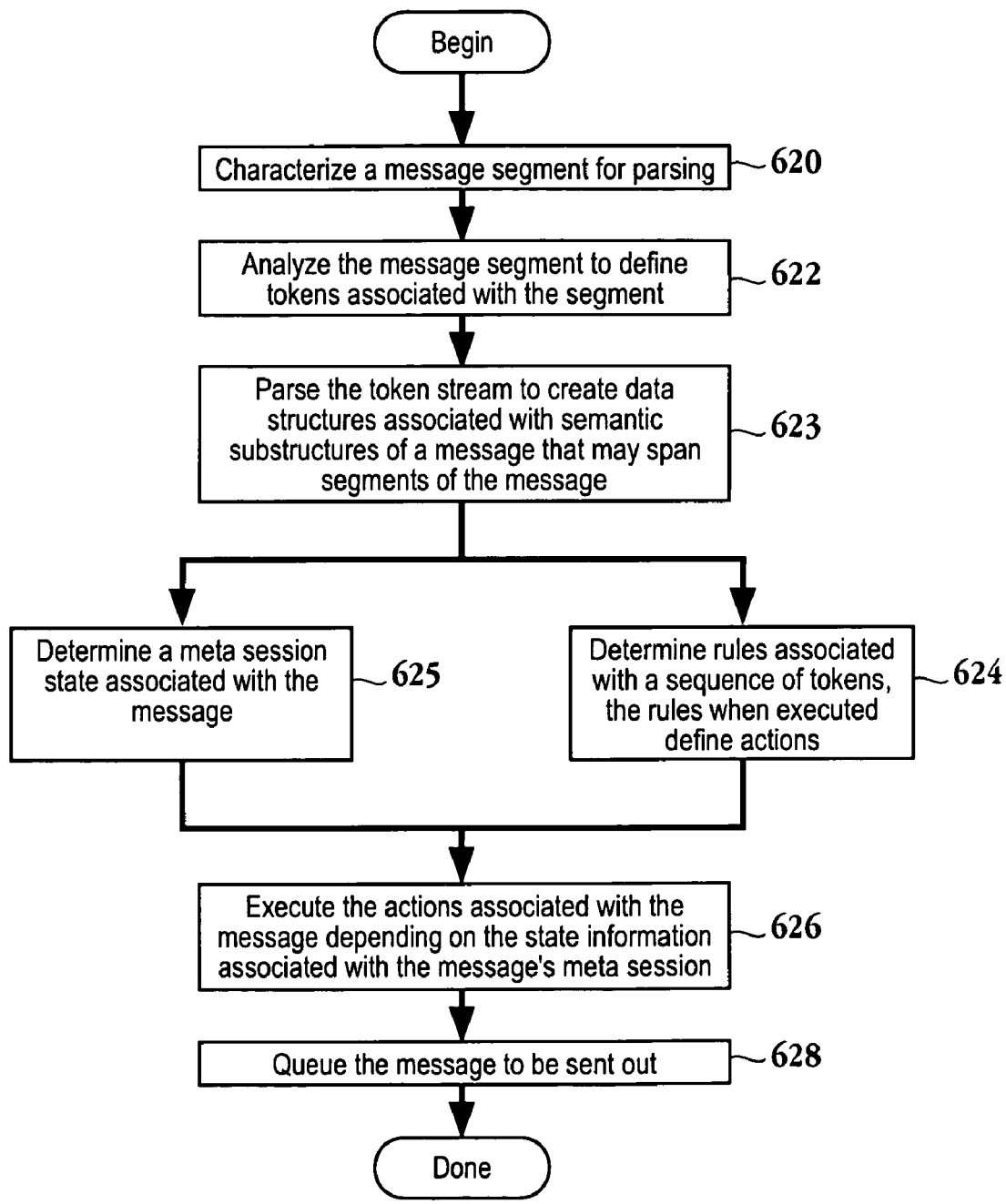
FIG. 25 is a flowchart diagram illustrating the method operations for performing semantic processing to provide content based security in accordance with one embodiment of the invention.

FIG. 25 is a flowchart diagram illustrating the method operations for performing semantic processing to provide content based security in accordance with one embodiment of the invention. The method initiates with operation 620 where a message for parsing is characterized. In one embodiment, the message is characterized by a message characterization block that evaluates a header associated with the message. Characterization rules, such as the characterization rules described with reference to FIG. 5B, are used to determine a type of grammar used to build the message, in another embodiment. The rules may be software programmable or hardwired in the hardware. It should be appreciated that the entire message may consist of multiple segments, e.g., multiple packets. The method then advances to operation 622 where the message is analyzed to define a token stream associated with the segments. For example, a lexical analyzer may be used to analyze the segment and define pieces corresponding to the segment. Here, pieces are a subpart of the segment. For example, a GET request may be divided into pieces/segments as illustrated with reference to FIG. 7. The method then proceeds to operation 623 where the token stream is parsed to create data structures associated with semantic substructures of a message that may span segments. In one embodiment, the parsing is performed by a tokenizer and parser as described above. That is, the message is converted into a token stream through the tokenizer and a parse tree is defined through the parser. The method then moves to operations 624 and 625 in parallel. In operation 624 the rules associated with a sequence of tokens are determined. In one embodiment, meta session state information is retrieved here by determining if the parsed tokens are associated with a meta session. As discussed above with reference to FIG. 10, the meta session state information is maintained across multiple physical sessions. After the rules associated with the tokens are determined the rules are applied using the token values and the meta session state. In operation 625, the meta session state associated with the message is determined. Here, a client-server communication from a past session may be associated with the current session as discussed above.

Continuing with FIG. 25, the method then advances to operation 626 where the actions associated with the message are executed dependent on the state information associated with the corresponding meta session. For example, the history of the message is considered here through the meta session information. For instance, spam may be identified through the history tracked by the meta session data. In one embodiment, the actions that need to be taken are queued. Here, the action execution engine as discussed with respect to FIG. 9 is a suitable engine for executing the actions. As mentioned above, semantic rules may be used to define the actions. The method then proceeds to operation 628 where the message to be sent out is queued. For example, a set of rules specifying the policies for sharing the output link bandwidth are executed by a queue block here, as discussed with reference to FIG. 5B.

In summary, the above described invention provides an intrusion prevention system configured to provided security for enterprise systems or any transactional based system, through content based evaluation. That is the content of an incoming message is used to fully understand the meaning of the message in order to provide a higher level of security. The SPU system described herein has many advantages as compared to a multiple CPUs/multiple thread approach and a accelerated single function approach. The simple compilers, built-in ability to support streaming functions, and available debug mechanisms offer a distinct advantage to the SPU system described herein.

The state information is maintained across sessions as described above. The segmentation of the message further adds to the importance of maintaining states. For example, the message characterization block (MCB) needs to reassemble the segments from multiple streams, however, the MCB does not hold segments. The tokenizer holds partial token match state as well as portions of strings. The parser holds stack and look ahead character, machine state and partial parse data. The rule engine holds thread context for each of the stalled processes. As discussed in the embodiments described above the state is maintained with respect to each of the blocks of the system in order to prevent unwanted intrusions in an efficient manner.

With respect to exception handling, such as unrecognizable grammar or tokens, missing TCP segments, inability to complete parsing, missing tokens, etc., the system addresses these items in order to prevent errors from accumulating. In one embodiment, a daemon, i.e., a machine in the background, that detects these items to prevent an error build up associated with segmentation garbage collection, grammar garbage collection and so on. Additionally, due to the streaming nature of the semantic processing system, everything becomes transient, therefore, the environment around a breakpoint is frozen to capture traffic which is especially helpful for debugging purposes. In one embodiment, hardware trace buffers associated with state machines and processors provide the ability to keep prior transactional records to look back in the case of an error.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The above described invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

The invention can also be embodied as computer readable code on a computer readable medium. The computer readable medium is any data storage device that can store data which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A method for evaluating contents of a message, comprising:
   characterizing a message segment, wherein the message segment further comprises a packet in a packet-switched network;
   scanning the message segment to define a stream of tokens associated with the message segment;
   associating the message segment with a meta session through the stream of tokens,
   wherein the meta session is made persistent across message transactions and different HTTP sessions by storing data generated by the meta session on a persistent storage medium;
   parsing the token stream to extract substructures according to a grammar;
   determining rules associated with the tokens, the rules when executed defining actions for intrusion detection and prevention;
   executing the actions associated with the message segment; and
   queuing the message segment for transmission to a destination, wherein each of the operations in the method is executed by an integrated circuit.

2. The method of claim 1, further including:
   retrieving meta session state information related to the message, wherein the meta session state information is invariant across different connections and a service context common to the different connections associates the different HTTP sessions of a user.

3. The method of claim 1, wherein the message segment is received from a sender, the sender using a network to send a message associated with the message segment, and the message associated with the message segment is identified as a suspect message which is quarantined.

4. The method of claim 1, wherein the method operation of parsing the tokens to extract substructures includes,
   creating a parse tree.

5. The method of claim 1, wherein the method operation of determining rules associated with the tokens includes,
   defining an object oriented scheme to associate the message segment with at least one of the rules.

6. The method of claim 5, wherein the method operation of defining an object oriented scheme to associate the message segment with at least one of the rules is enabled through grammar based access.

7. The method of claim 1, wherein the method operation of parsing the tokens to extract substructures includes,
   searching a list of keywords; and
   inferring semantics of sub-strings between the key words.

8. The method of claim 1, wherein the message is composed of multiple segments.

9. The method of claim 8, wherein the substructures span multiple message segments.

10. A computer readable media having stored computer program instructions for evaluating the contents of a message, comprising
    computer program instructions for characterizing a message segment, wherein the message segment further comprises a packet in a packet-switched network;
    computer program instructions for scanning the message segment to define a stream of tokens associated with the message segment;
    computer program instructions for associating the message segment with a meta session through the stream of tokens, wherein the meta session is made persistent across message transactions and different HTTP sessions by storing data generated by the meta session on a persistent storage medium;
    computer program instructions for parsing the token stream to extract substructures according to a grammar;
    computer program instructions for determining rules associated with the tokens, the rules defining actions for intrusion detection and prevention;
    computer program instructions for executing the actions associated with the message segment; and
    computer program instructions for queuing the message segments for transmission, wherein the each of the computer program instructions in the computer readable media are executed by an integrated circuit.

11. The computer readable media of claim 10, further including:
    computer program instructions for retrieving meta session state information related to the message, wherein the meta session state information is invariant across different connections and a service context common to the different connections associates the different HTTP sessions of a user.

12. The computer readable media of claim 10, wherein the computer program instruction for characterizing a message segment includes,
    computer program instructions for determining a grammar type of the message.

13. The computer readable media of claim 10, wherein the computer program instructions for parsing the tokens to extract substructures includes,
    computer program instructions for creating a parse tree.

14. The computer readable media of claim 10, wherein the message is configured to be sent in multiple segments through a packet based network.

15. The computer readable media of claim 10, wherein the computer program instructions for parsing the tokens to extract substructures includes,
    computer program instructions for searching a list of keywords; and
    computer program instructions for inferring semantics of sub-strings between the key words.

16. A network device configured to provide content based security, comprising:
    circuitry for scanning a message segment to define a stream of tokens associated with the message segment, wherein the message segment further comprises a packet in a packet-switched network;
    circuitry for extracting substructures from the stream of tokens, according to a grammar;
    circuitry for associating the message with a meta session, wherein the meta session is made persistent across message transactions and different HTTP sessions by storing data generated by the meta session on a persistent storage medium;
    circuitry for identifying rules associated with the tokens, wherein the rules define actions for intrusion detection and prevention; and
    circuitry for executing the identified rules.

17. The network device of claim 16, wherein the circuitry for extracting substructures from the tokens includes,
    circuitry for retrieving meta session state information related to the message, wherein the meta session state information is invariant across different connections and a service context common to the different connections associates the different HTTP sessions of a user.

18. The network device of claim 16, wherein the circuitry for scanning a message to define tokens associated with the message includes,
   circuitry for searching a list of keywords; and
   circuitry for inferring semantics of sub-strings between the key words.

19. The network device of claim 16, further comprising:
   circuitry for determining a grammar type of the message.

20. The network device of claim 16, wherein the circuitry for scanning a message to define tokens associated with the message includes,
   circuitry for building a data structure from the defined tokens.

\* \* \* \* \*